United States Patent
Satoh

(10) Patent No.: US 8,886,023 B2
(45) Date of Patent: Nov. 11, 2014

(54) BLIND-SPOT IMAGE DISPLAY SYSTEM FOR VEHICLE, AND BLIND-SPOT IMAGE DISPLAY METHOD FOR VEHICLE

(75) Inventor: Noriyuki Satoh, Bunkyo-ku (JP)

(73) Assignee: Clarion Co., Ltd., Tokyo (JP)

( * ) Notice: Subject to any disclaimer, the term of this patent is extended or adjusted under 35 U.S.C. 154(b) by 410 days.

(21) Appl. No.: 13/383,474

(22) PCT Filed: Jul. 2, 2010

(86) PCT No.: PCT/JP2010/061306
§ 371 (c)(1),
(2), (4) Date: Jan. 11, 2012

(87) PCT Pub. No.: WO2011/007683
PCT Pub. Date: Jan. 20, 2011

(65) Prior Publication Data
US 2012/0113261 A1 May 10, 2012

(30) Foreign Application Priority Data
Jul. 13, 2009 (JP) .................. 2009-164726

(51) Int. Cl.
| H04N 5/76 | (2006.01) |
| H04N 7/18 | (2006.01) |
| G06T 19/00 | (2011.01) |
| B60R 1/00 | (2006.01) |
| G06T 3/40 | (2006.01) |
| G06T 11/00 | (2006.01) |

(52) U.S. Cl.
CPC .. B60R 1/00 (2013.01); H04N 7/18 (2013.01); B60R 2300/8026 (2013.01); B60R 2300/202 (2013.01); G06T 19/006 (2013.01); G06T 19/00 (2013.01); G06T 3/4038 (2013.01); B60R 2300/304 (2013.01); G06T 11/00 (2013.01); B60R 2300/60 (2013.01)
USPC .......................................... 386/362; 386/358

(58) Field of Classification Search
None
See application file for complete search history.

(56) References Cited

U.S. PATENT DOCUMENTS

| 2003/0108222 A1 | 6/2003 | Sato et al. |
| 2007/0088474 A1* | 4/2007 | Sugiura et al. .................. 701/36 |
| 2011/0043632 A1 | 2/2011 | Satoh |
| 2013/0250046 A1* | 9/2013 | Schofield et al. ............... 348/36 |

FOREIGN PATENT DOCUMENTS

| JP | 2003-244688 | 8/2003 |
| JP | 2004-350303 | 12/2004 |
| JP | 2005-335410 | 12/2005 |
| JP | 2008-39395 | 2/2008 |
| JP | 2008-85691 | 4/2008 |

OTHER PUBLICATIONS

International Search Report issued Oct. 5, 2010 in International (PCT) Application No. PCT/JP2010/061306.

* cited by examiner

Primary Examiner — William C Vaughn, Jr.
Assistant Examiner — Eileen Adams
(74) Attorney, Agent, or Firm — Wenderoth, Lind & Ponack, L.L.P.

(57) ABSTRACT

A see-through side view monitor system includes a camera, an external monitor, and an image processing controller having an image deformation unit configured to perform point-of-view conversion on a real camera image signal inputted from the camera into a blind-spot image that is viewed from the position of the driver's point of view. A vehicle cabin image formation unit is configured to form a vehicle cabin image that is viewed from the position of the driver's point of view. An image composition device is configured to generate a transparent display image showing a blind-spot image transmitted through a semi-see-through vehicle cabin image, and an image composition device is configured to generate an animation display image showing the blind-spot image to be shifted stepwise from the vehicle cabin image.

9 Claims, 15 Drawing Sheets

EXTERNAL
POINT-OF-VIEW
CONVERTED IMAGE

VEHICLE CABIN IMAGE

SEMI-SEE-THROUGH
COMPOSITE IMAGE (1)

SEMI-SEE-THROUGH
COMPOSITE IMAGE (2)

SEMI-SEE-THROUGH
COMPOSITE IMAGE (3)

VEHICLE CABIN
IMAGE FOR LAYER 1

DOOR INSIDE
IMAGE FOR LAYER 2 (1)

DOOR INSIDE
IMAGE FOR LAYER 3 (2)

EXTERNAL
POINT-OF-VIEW
CONVERTED IMAGE

ONLY (1) 100%

(1)80% + (2)20%

(1)30% + (2)70%

(1)10% + (2)90%

(1)10% + (2)70% + (3)20%

(2)20% + (3)80%

(3)70% + (4)30%

(3)30% + (4)70%

(1)15% + (4)85%

THREE-DIMENSIONAL SEE-THROUGH IMAGE

BLIND-SPOT IMAGE DISPLAY SYSTEM FOR VEHICLE, AND BLIND-SPOT IMAGE DISPLAY METHOD FOR VEHICLE

TECHNICAL FIELD

The present invention relates to a blind-spot image display system for a vehicle and a blind-spot image display method for a vehicle, with which a blind-spot image is displayed on a monitor as if the blind-spot image is an image of the blind spot seen from a position of a driver's point of view through a semi-transparent image of a vehicle cabin.

BACKGROUND ART

In the side view monitor system which is in practical use at present, a side camera (such as a CCD camera) is set inside a side mirror, and a real camera image from the side camera is displayed on a monitor screen of a front display unit which is also used for a navigation system.

That is to say, displaying the front lateral area of a vehicle, which is the blind spot of a driver, on the monitor screen allows the driver to recognize the condition of the blind spot.

However, because the side camera is disposed inside the side mirror, there is a high parallax (in a range of 1 m to 2 m) between the camera's point of view and the driver's point of view, and thus the shape of an obstacle or other object in the view from the camera, and that in the view from the driver's seat are completely different.

On the other hand, in a normal case, an experienced driver reconstructs the image from the camera in his/her head, then reconstructs and recognizes a positional relationship with objects, and thus keeps the consistency between the image on the screen and the image viewed by the driver him/her self. On the other hand, an inexperienced driver or a driver who needs to respond instantly may not keep the consistency between the image on the screen and the image viewed from the driver's seat, and thus feels a sense of inconsistency.

In order to eliminate such a sense of inconsistency, a signal of a camera image captured by a blind-spot camera which is provided outside the vehicle body is converted to a virtual camera image which is as if viewed from a position of the driver's point of view so that a converted outside image is generated. In addition, an image of visual recognition area is generated that is a camera image excluding the blind-spot area, the camera image being captured by a driver's point-of-view camera provided near the position of the driver's point of view. A blind-spot image display system for vehicle has been proposed, in which a composite image is obtained by superimposing the converted outside image on the blind-spot area excluded from the image of visual recognition area (for example, see Patent Document 1).

PRIOR ART DOCUMENT

Patent Document

Patent Document 1: Japanese Patent Application Publication No. 2004-350303

However, the conventional blind-spot image display system for vehicle has the problems listed below.

(1) The blind spot and the sense of inconsistency are intended to be eliminated by principally cutting out and combining two camera images, and enhancing and detecting the edge portions such as window frames of one of the images, then by performing superimposition using the edge portions. However, there still is a certain limit in the above processing, and thus an inconsistency is caused in the image.

(2) In the case where a blind-spot camera as described as an example is used, which has wide elevation and depression angles in the vertical direction, the blind-spot camera sufficiently covers the field of view of the indoor camera (driver's point-of-view camera), and contribution of the image of the indoor camera to blind-spot elimination is made for only a part of the field of view such as an upper portion of the trunk, and thus this configuration is wasteful as a system.

(3) Although the superimposing frames in the edge enhancement, which are used when combining the camera images requires an additional image processing function, the superimposing frames does not provide sufficient effect to a driver in making the driver recognize that the driver is viewing the blind-spot of the vehicle.

Thus, the applicant previously proposed a blind-spot image display system for a vehicle, which converts a real camera image signal inputted from an in-vehicle camera into a virtual camera image that is viewed from the position of the driver's point of view, and thus presents the virtual camera image through a semi-transparent image of the vehicle cabin by image composition which is achieved by superimposing the semi-transparent image of the vehicle cabin onto the virtual camera image (Japanese Patent Application No. 2008-39395 filed on February 20, Heisei 20).

According to the above-described proposal, a blind-spot image which gives little sense of inconsistency to a driver is provided by performing computation and image conversion processing to see how an image, when being viewed from the driver's position, looks like, the image showing the areas near the vehicle that are normally not seen. This blind-spot image, for the sake of expediency, uses a form of a semi-see-through image for viewing the outside through the image of the vehicle cabin including the doors, and thus is intended to provide intuitively easy-to-understand image presentation in an instant situation, and has contributed to safe driving.

However, when a system implementing the above-described proposal is actually employed, the following visibility problem has occurred. It has been found from the results of experiments using subjects that even when the semi-transparent image is displayed, some users including the elderly don't understand quickly what the image shows. For example, when it is explained to users that the image from a side mirror is converted to an image from a driver's point of view so that the blind-spot image, which cannot be seen normally, is displayed as a semi-see-through image, 100 out of 100 users understand the explanation, and recognize the usability of the system. However, when such an explanation is not provided, extremely small number of users don't understand what the image shows. That is to say, it has been found that one of the main objects of the proposal, i.e., "contribution to safe driving by eliminating blind spots using intuitively easy-to-understand image presentation" may not be achieved.

Inferring the cause of this issue from the information regarding the subjects, some of them simply perceive that a semi-see-through image displayed on the monitor is a two-dimensional image, and thus they don't see any correspondence between the image on the monitor which is originally presented as a three-dimensional image, and their spatial perception of the image in their heads, resulting in a mistaken perception of the image. This is because the vehicle cabin image in a semi-see-through portion has been set to have a relatively high transparency for the sake of its purpose, and thus the vehicle cabin images constituting the semi-see-through portion are difficult to visually recognize, and the presentation of the view from the vehicle cabin to the outside is difficult to perceive. However, if the transparency of the see-through image is reduced, it becomes difficult to recognize the blind-spot image, causing another problem.

As a common problem between the camera systems, the power of a camera is often turned ON at the time of start of system operation in order to obtain an energy saving effect, and thus due to a time lag in the activation of the camera in this case, a user often needs to wait until a monitor screen displays an actual image from the camera, while the camera keeps displaying a blue back or a black screen.

SUMMARY OF THE INVENTION

The present invention has been made focusing on the above problems, and it is an object of the invention to provide a blind-spot image display system for vehicle and a blind-spot image display method for vehicle that facilitate a user to understand that what is viewed from the position of the driver's point of view in the system is the blind-spot image through the semi-transparent image of the vehicle cabin, so that the blind spot is eliminated, and thus contribution to the implementation of safe driving may be achieved.

In order to achieve the above-mentioned object, the blind-spot image display system for vehicle of the present invention includes: a camera configured to capture the surroundings of a vehicle that is a blind spot from a driver; a monitor set at a location in a vehicle cabin; and an image processing controller configured to generate a monitor image signal for the monitor by image processing based on the real camera image signal inputted from the camera. In the blind-spot image display system, the image processing controller includes: a blind-spot image formation unit configured to perform point-of-view conversion on the real camera image signal inputted from the camera into the blind-spot image that is viewed from the position of the driver's point of view; a vehicle cabin image formation unit configured to form the vehicle cabin image that is viewed from the position of the driver's point of view; a see-through display image generation unit configured to render the vehicle cabin image to be superimposed on the blind-spot image into a semi-transparent vehicle cabin image; and an animation display image generation unit configured to generate an animation display image in which the vehicle cabin image to be superimposed on the blind-spot image is shifted stepwise from a non-transparent image to a see-through image.

EFFECT OF THE INVENTION

Thus, in the blind-spot image display system for a vehicle of the present invention, in addition to transparent display function for showing the blind-spot image through a semi-transparent image of the vehicle cabin, an animation display function is included for showing that the blind-spot image gradually appears on the image of the vehicle cabin by image processing which shifts the image of the vehicle cabin superimposed on the blind-spot image stepwise from a non-transparent image to a transparent image. This is because even when the blind-spot image viewed from the position of the driver's point of view is shown in such a manner that the blind-spot image is seen through the semi-transparent image of the vehicle cabin, some users don't understand quickly what the image on a monitor shows. On the other hand, for example, prior to the transparent display of the blind-spot image, an animation display is shown to a user, or a user watches the animation display by the user's intention, thereby enabling a user to easily understand that the monitor image displayed on an external monitor is the blind-spot image displayed through the semi-transparent image of the vehicle cabin. Consequently, by facilitating a user to understand that what is viewed from the position of the driver's point of view in the system is the blind-spot image through the semi-transparent image of the vehicle cabin, the blind spot is eliminated, and thus contribution to the implementation of safe driving may be achieved.

BRIEF DESCRIPTION OF THE DRAWINGS

FIG. 3-1 is a diagram showing an example of an external point-of-view converted image which is obtained by converting an image from a side camera into an image that is viewed from a driver's position in Embodiment 1.

FIG. 3-2 is a diagram showing an example of a vehicle cabin image that is viewed from a driver's point of view in Embodiment 1.

FIG. 3-3 is a diagram showing an example of a semi-see-through composite image (1) composed of an external point-of-view converted image, and a semi-see-through vehicle cabin image with a transparency of approximately 20% in Embodiment 1.

FIG. 3-4 is a diagram showing an example of a semi-see-through composite image (2) composed of an external point-of-view converted image, and a semi-see-through vehicle cabin image with a transparency of approximately 50% in Embodiment 1.

FIG. 3-5 is a diagram showing an example of a semi-see-through composite image (3) composed of an external point-of-view converted image, and a semi-see-through vehicle cabin image with an initially set transparency in Embodiment 1.

FIG. 4 is an overall system block diagram showing a see-through side view monitor system A1 in Embodiment 2 (an example of a blind-spot image display system for vehicle).

FIG. 5 is a flowchart showing the flow of the animation display control processing that is performed in the see-through side view monitor system A2 in Embodiment 2.

FIG. 7-1 is a diagram showing an example of a vehicle cabin image for a layer 1 viewed from a driver's point of view in Embodiment 3.

FIG. 7-2 is a diagram showing an example of a door inside image for a layer 2 (1) viewed from the driver's point of view in Embodiment 3.

FIG. 7-3 is a diagram showing an example of a door inside image for a layer 3 (2) viewed from the driver's point of view in Embodiment 3.

FIG. 7-4 is a diagram showing an example of an external point-of-view converted image which is obtained by converting an image from a side camera into an image that is viewed from a driver's position in Embodiment 3.

FIG. 7-5 is a perspective view showing an example of a conceptual screen configuration including a layer (1) of a cabin interior image, a layer (2) of an internal image 1, a layer (3) of an internal image 2, and a layer (4) of an external image in Embodiment 3.

FIG. 8-1 is a diagram showing an example of a composite image in a screen configuration including the layer (1) of the cabin interior image with a non-transparency of 100% in Embodiment 3.

FIG. 8-2 is a diagram showing an example of a composite image in a screen configuration including the layer (1) of the cabin interior image with a non-transparency of 80%, and the layer (2) of the internal image 1 with a non-transparency of 20% in Embodiment 3.

FIG. 8-3 is a diagram showing an example of a composite image in a screen configuration including the layer (1) of the cabin interior image with a non-transparency of 30%, and the layer (2) of the internal image 1 with a non-transparency of 70% in Embodiment 3.

FIG. 8-4 is a diagram showing an example of a composite image in a screen configuration including the layer (1) of the cabin interior image with a non-transparency of 10%, and the layer (2) of the internal image 1 with a non-transparency of 90% in Embodiment 3.

FIG. 8-5 is a diagram showing an example of a composite image in a screen configuration including the layer (2) of the internal image 1 with a non-transparency of 70%, and the layer (3) of the internal image 2 with a non-transparency of 30% in Embodiment 3.

FIG. 8-6 is a diagram showing an example of a composite image in a screen configuration including the layer (1) of the internal image 1 with a non-transparency of 20%, and the layer (3) of the internal image 2 with a non-transparency of 80% in Embodiment 3.

FIG. 8-7 is a diagram showing an example of a composite image in a screen configuration including the layer (3) of the internal image 2 with a non-transparency of 70%, and the layer (4) of the external image with a non-transparency of 30% in Embodiment 3.

FIG. 8-8 is a diagram showing an example of a composite image in a screen configuration including the layer (3) of the internal image 2 with a non-transparency of 30%, and the layer (4) of the external image with a non-transparency of 70% in Embodiment 3.

FIG. 8-9 is a diagram showing an example of a composite image in a screen configuration including the layer (1) of the cabin interior image with a non-transparency of 15%, and the layer (4) of the external image with a non-transparency of 85% in Embodiment 3.

FIG. 9 is an overall system block diagram showing a see-through side view monitor system A4 in Embodiment 4 (an example of a blind-spot image display system for vehicle).

DETAILED DESCRIPTION OF THE INVENTION

Figure 1:
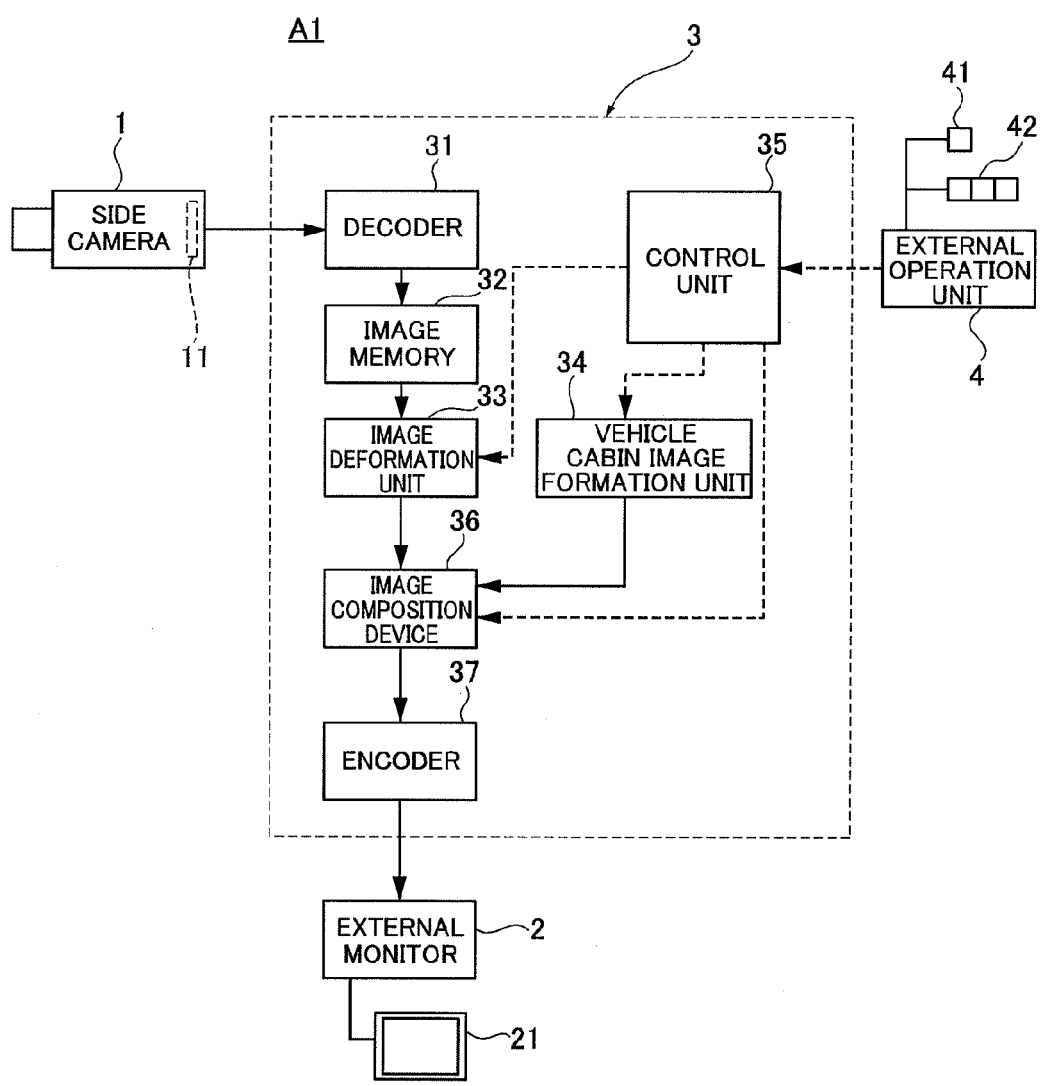
FIG. 1 is an overall system block diagram showing a see-through side view monitor system A1 in Embodiment 1 (an example of a blind-spot image display system for vehicle).

Hereinafter, the best mode in which the blind-spot image display system for vehicle and the blind-spot image display method for vehicle in the present invention are implemented is described based on embodiments 1 to 4 shown in the drawings. In embodiments 1 to 4, as a see-through blind-spot image display system for vehicle, a specifically defined "see-through side view monitor system" is described, that displays the image of the front lateral area of a vehicle on an external monitor, as an image viewed through the vehicle body from the vehicle cabin, the front lateral area being the blind spot of a driver and being captured by using a side camera.

Embodiment 1

First, the configuration is described. FIG. 1 is an overall system block diagram showing a see-through side view monitor system A1 in Embodiment 1 (an example of a blind-spot image display system for vehicle).

The see-through side view monitor system A1 in Embodiment 1 is an example which employs, as an image processing technique for animation presentation, a semi-see-through technique which superimposes a vehicle cabin image with a transparency being changed stepwise, on the blind-spot image based on a real camera image signal (the semi-see-through technique is an image composition technique which superimposes a single sheet of a vehicle cabin image with a transparency being changed stepwise, on the original blind-spot image, and thus hereinafter, referred to as a single layer semi-see-through technique). As shown in FIG. 1, the system A1 includes a side camera 1 (camera), an external monitor 2 (monitor), an image processing control unit 3 (image processing controller), and an external operation unit 4.

The side camera 1 is built in the left side mirror or is arranged and disposed in the proximity to the left side mirror, so as to capture the image of the front lateral area of a vehicle, which is the blind spot of a driver. The side camera 1 captures a real camera image signal of the front lateral area of the vehicle, which exists on the optical axis of the camera lens, by using a built-in image pickup device 11 (such as a CCD, CMOS).

The external monitor 2 is set at a location in the vehicle cabin, which can be visually recognized by the driver (for example, an instrument panel location or the like). The external monitor 2 has a monitor screen 21 using a liquid crystal display, an organic el display, or the like, and receives an input of a monitor image signal that is generated by the image processing control unit 3, and displays the monitor image. Here, as the external monitor 2, a monitor dedicated to the see-through side view monitor system A1 may be set. Alternatively, a monitor dedicated to a camera system for eliminating the blind-spot may be set. Otherwise, a monitor of other system such as a navigation system may be used.

The image processing control unit 3 performs image processing such as image deformation, image formation, image composition, and the like in accordance with a set image processing program, based on the input information from the external operation unit 4 in addition to the real camera image signals inputted from the side camera 1, then generates a monitor image signal to the external monitor 2.

The external operation unit 4 has a system activation switch 41 for turn-on operation at the time of system activation, and a mode select switch 42 configured to switch between animation automatic display position, animation display prohibited position, and animation manual display position. The external operation unit 4 may be configured to serve as a touch panel switch displayed on the monitor screen 21 of the external monitor 2, or as operation buttons arranged on the outer circumferential location of the external monitor 2.

As shown in FIG. 1, the image processing control unit 3 includes a decoder 31, an image memory 32, an image deformation unit 33 (a blind-spot image formation unit), a vehicle body image formation unit 34 (vehicle cabin image formation unit), a control unit (CPU) 35, an image composition device 36 (animation display image generation unit, see-through display image generation unit), and an encoder 37. Hereinafter, each component is described.

The decoder 31 performs analog-digital conversion on the real camera image signal inputted from the side camera 1 so as to generate real camera image data.

The image memory 32 temporarily stores the real camera image data from the decoder 31, which has been digitally converted.

The image-deformation unit 33 deforms the digitally converted real camera image data into external point-of-view converted image data by point-of-view conversion processing based on a command from the control unit 35, the digitally converted real camera image data being inputted from the image memory 32, and the external point-of-view converted image data being what is viewed from a virtual camera disposed in the proximity to the driver's point of view. In the image deformation unit 33, the point-of-view conversion processing of the surrounding image based on the real camera image data is performed as image processing, while other various image processing (luminance control, tint correction, edge correction, or the like) may be performed.

The vehicle body image formation unit 34 forms semi-transparent vehicle cabin image data with which image composition (superimposition) is performed on the external point-of-view converted image data from the image deformation unit 33. In the vehicle body image formation unit 34, a non-transparent vehicle cabin image data previously captured from the driver's point of view is prepared, and semi-transparent vehicle cabin image data with a different transparency is formed by α blend processing based on a transparency command from the control unit 35. The semi-transparent vehicle cabin image data is such that the transparencies of the entire portions of the vehicle cabin image data are not different, however, only those vehicle body regions such as a door or an instrument panel which is set as a preferable region to be transparent through the blind-spot image are defined as "semi-transparent portions" which each have a different transparency. Then, the window region of the front window or a door window is defined as a "transparent portion" with a transparency of 100%, and the projection area where the vehicle is projected on the road surface is defined as a "non-transparent portion" with a transparency of 0%.

The control unit 35 is a central processing unit (CPU) which manages all the information processing and control output related to image processing in accordance with an input from the external operation unit 4, and has a set control program to perform animation display control and blind-spot image see-through display control according to a control command for the image deformation unit 33, the vehicle body image formation unit 34, and the image composition device 36. In addition, the control unit 35 has a set control program to perform other image processing control, for example, external image luminance tracking display control, luminance sudden change responding display control, hue conversion display control, warning display control, and the like.

The image composition device 36 generates composite image data by the image composition processing that superimposes the semi-transparent vehicle cabin image data from the vehicle body image formation unit 34 onto the external point-of-view converted image data from the image deformation unit 33. For example, when animation display control is performed, composite image data is generated by superimposing the vehicle cabin image data on the external point-of-view converted image data, the vehicle cabin image data having stepwise increased transparencies. For example, when blind-spot image see-through display control is performed, composite image data is generated by superimposing semi-transparent vehicle cabin image data having a defined transparency onto the external point-of-view converted image data.

The encoder 37 receives an input of composite image data from the image composition device 36, and performs digital-analog conversion on the composite image data, then outputs a monitor image signal to the external monitor 2. For example, when animation display control is performed, the encoder 37 outputs monitor image signals which present, as image presentation on the monitor screen 21, a flow of the blind-spot image that gradually appears with the passage of time, through the vehicle cabin image which is initially in non-transparent state. For example, when blind-spot image see-through display control is performed, the encoder 37 outputs monitor image signals which present, as image presentation on the monitor screen 21, the blind-spot image viewed from the driver, as if the blind-spot image is seen through the semi-transparent vehicle cabin image.

Figure 2:
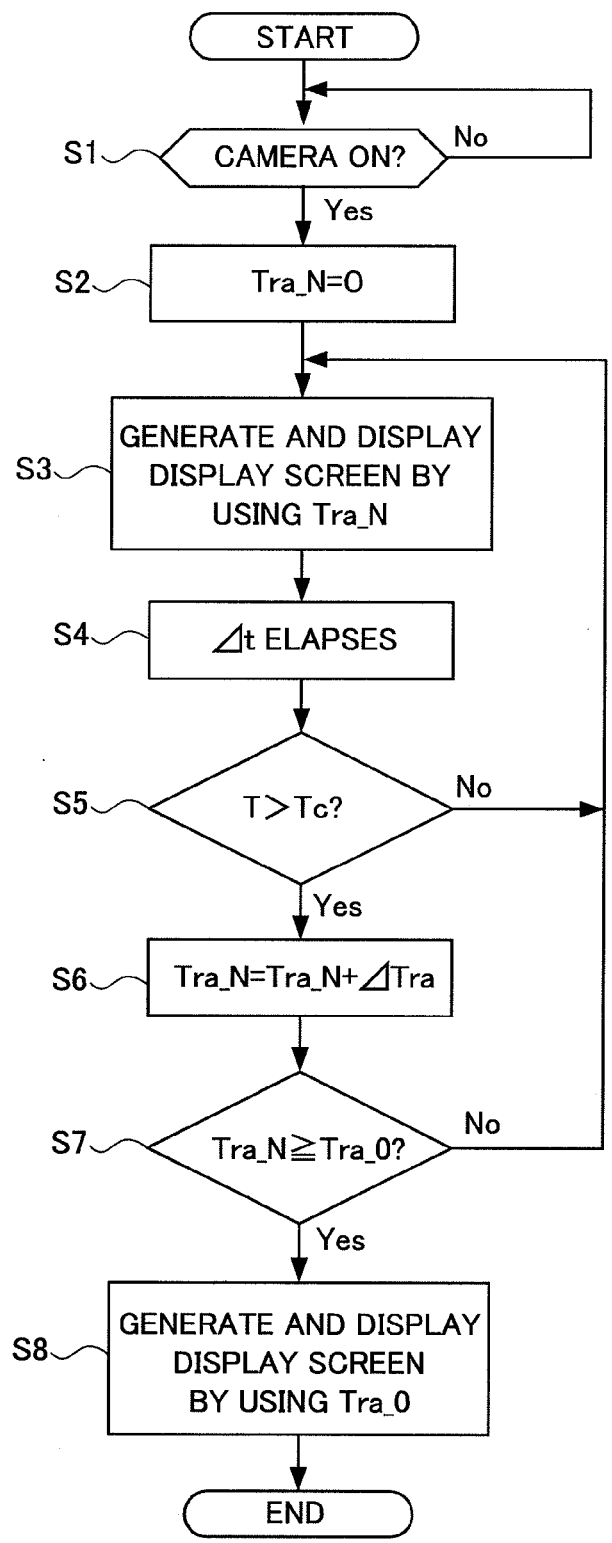
FIG. 2 is a flowchart showing the flow of the animation display control processing that is performed in the see-through side view monitor system A1 in Embodiment 1.

FIG. 2 is a flowchart showing the flow of the animation display processing and the see-through display processing performed by the image processing control unit 3 in Embodiment 1. Hereinafter, each step in FIG. 2 is described.

In step S1, it is determined whether or not the power of the side camera 1 is ON. When the determination is YES (camera is ON), the flow proceeds to step S2, otherwise when the determination is NO (camera is OFF), determination in step S1 is repeated. Here, the power of the side camera 1 is turned ON in the following operation patterns:

The system activation switch 41 is turned ON in a state where the animation automatic display position has been selected by the mode select switch 42.

The system activation switch 41 is turned ON and a switching operation to the animation manual display position is performed in a state where the animation display prohibited position has been selected by the mode select switch 42. In the present system, in order to have an energy saving effect, the power of the camera is activated in synchronization with a system activation operation, and thus the power of the camera is turned ON when the system activation operation is started.

In step S2, subsequent to the camera power ON in step S1, the transparency of the semi-transparent vehicle cabin image data is set as Tra_N=0, and the flow proceeds to step S3.

In step S3, subsequent to the setting of Tra_N=0 in step S2, determination of T≤Tc in step S5, or determination of Tra_N<Tra_0 in step 7, semi-transparent vehicle cabin image data is formed by using the set transparency Tra_N. Then a monitor image signal is generated by image data composition, and is outputted to the external monitor 2, the image data composition being performed by superimposing the semi-transparent vehicle cabin image data on the external point-of-view converted image data. Thus the composite image composed of the external point-of-view converted image and the semi-transparent vehicle cabin image is displayed on the monitor screen 21, and the flow proceeds to step S4. Until the elapsed time T from the camera power ON reaches an initial stabilization time Tc, there is no external point-of-view converted image data based on the camera image, and thus a vehicle cabin image with a transparency of Tra_N=0 (single image) is displayed instead of a composite image.

In step S4, subsequent to the display of the composite image using the transparency Tra_N in step S3, the current composite image is displayed until a preset time for stepwise display Δt is elapsed, and the flow proceeds to step S5.

In step S5, subsequent to the elapsing of the preset time for stepwise display Δt, it is determined whether or not the elapsed time T from the camera power ON exceeds the initial stabilization time Tc, and when the determination is YES (T>Tc, the flow proceeds to step S6, otherwise when the determination is NO (T≤Tc), the flow returns to step S3.

In step S6, subsequent to the determination of T>Tc in step S5, the next transparency Tra_N (=Tra_N+ΔTra) is set by adding a preset transparency ΔTra to the current transparency Tra_N, and the flow proceeds to step S7.

In step S7, subsequent to the setting of the next transparency Tra_N in step S6, it is determined whether or not the set transparency Tra_N is greater than or equal to the initially set transparency Tra_0. When the determination is YES (Tra_N≥Tra_0), the flow proceeds to step S8, otherwise when the determination is NO (Tra_N<Tra_0), the flow returns to step S3. Here, the initially set transparency Tra_0 is the value indicating the transparency of the semi-transparent vehicle cabin image data that is used when blind-spot image see-through display is performed.

In step S8, subsequent to the determination of Tra_N≥Tra_0 in step S7, semi-transparent vehicle cabin image data is formed by using the transparency Tra_0, and a monitor image signal is generated by image data composition, and is outputted to the external monitor 2, the image data composition being performed by superimposing the semi-transparent vehicle cabin image data on the external point-of-view converted image data. Thus the composite image (blind-spot image by the see-through display) composed of the external point-of-view converted image and the semi-transparent vehicle cabin image is displayed on the monitor screen 21, and the flow proceeds to the end.

Next, the operation is described. First, "the essence of the present invention" is described, and subsequently "continuous display operation from animation display to see-through display" in the see-through side view monitor system A1 in Embodiment 1 is described.

[Essence of the Present Invention]
(Point of the Invention)

The present invention takes a measure against the problem of Japanese Patent Application No. 2008-039395, that there exist a small number of users who don't understand that superimposed semi-transparent vehicle image is the image of the vehicle to be made transparent.

With the existing technology, only the blind-spot area is gradually made to be semi-transparent by using a static image of the vehicle interior and the camera image, then a static image inside a door is also used and is made to be transparent stepwise by animation so that it is well understood that the superimposed image is the image to be made transparent.

The presentation method basically uses the following techniques.

(1) In the see-through blind-spot image display system for vehicle, when the outside of the vehicle is shown through the vehicle cabin, without showing a fixed semi-transparent vehicle cabin image in a superimposed manner, an opaque (non-transparent) vehicle cabin image is first shown, and the transparency of the vehicle cabin image is gradually increased. Thus, semi-transparent, a blend processing is performed stepwise on the structural material inside a door, the window glass, and the outer plate, while the vehicle gradually becomes transparent as if by an operation of a user, and finally, the external blind-spot image can be viewed (Embodiment 1, Embodiment 2).

(2) In regard to the stepwise transparency processing, at least the following two techniques are proposed.

i) a two-dimensional semi-see-through technique which performs image processing by using several sheets of static image or directly captured image of the vehicle cabin, as source images in a structure with multiple layers, and the image is made semi-transparent per layer with the transparency of each layer being changed so that the layers are made to be transparent stepwise layer by layer (Embodiment 3).

ii) a three-dimensional semi-see-through technique with which when a virtually arranged planar or curved screen moves from the inside to the outside with three-dimensional information being rendered to the vehicle cabin image, the inner image which is three-dimensionally cut off by the screen is made to be semi-transparent, and actual vehicle structure and the image, the static image of the interior equipment are used for the outer three-dimensional space, so that stepwise semi-see-through images are obtained (Embodiment 4).

(3) A technique which uses audio information, and enhances a user's understanding by announcing audio description corresponding to the current monitor screen selected by the user (other embodiments).

The proposal herein is to demonstrate what is displayed are see-through images at the time of system activation by using animation presentation for the sake of clarity. Specifically, when see-through images are displayed to a user, for the first time demonstration, or until the user gets used to the see-through images, or as long as a user requests the demonstration, the cabin image, the image with the interior equipment of a door being removed, the image inside a door, the image of the outer plate of a door, and the external image are made to be transparent sequentially. What is proposed is a technique to show semi-see-through images including such a demonstration video at the time of system activation.

(Summary of the Invention)

What is provided is a system which performs point-of-view conversion on the image captured by a blind-spot camera and displays the converted image, and combines other camera images and the vehicle cabin images (static image) to show the external image through a semi-transparent vehicle body, thereby facilitating the understanding that what is displayed are semi-transparent images, and thus contributing to safe driving.

The stabilization period at the time of camera activation is utilized to display the vehicle cabin image from non-transparent state to semi-transparent state in a continuously changing manner, and thus enhancing a user's understanding.

Initially, at the time of system activation, the vehicle cabin image is displayed in non-transparent state to semi-transparent state in a continuously changing manner, and the display may be set to non-display according to a selection by a user.

(Object of the Invention)

To establish and provide a system which facilitates the understanding of semi-see-through image at a glance by some users who are not good at spatial recognition.

A time lag period caused at the time of camera activation is advantageously utilized to display animation image during the period for illustrating what is displayed are semi-see-through images. Thereby, facilitating a user to recognize that what is displayed are images that are viewed through semi-see-through vehicle body so that a user's understanding of the system is deepened, and thus a more easy-to-understand system is constructed.

By showing animation during a waiting time (several seconds) before actual camera image display comes up, an entertainment feature is improved and thus commercial value is increased.

When explanation is given verbally, almost 100% of the users can understand the explanation, and thus by adding an audio explanation function to the system, easy-to-understand system is constructed, that contributes to safe driving.

(Effect of the Invention)

The present invention provides a presentation method which has a great potential to be used as a display technique in order to achieve an actual see-through blind-spot image display system for vehicle, and the following effects may be expected.

Even with the previously proposed system, almost all users could understand that what is displayed are see-through blind-spot images, and thus contributing to safe driving, however, an extremely small number of users are exceptional. For those exceptional users, a more easy-to-understand system can be constructed using images only, and thus leading to an improvement in safety.

Even in the camera activation time (initial stabilization time), which is an intrinsic weak point, animation image is displayed, and thus not only a user's understanding of the system may be enhanced by utilizing undesired waiting time, but also annoyance of the users may be prevented.

Manual adjustment of the transparency is possible in the previously proposed system, however, animation image is always displayed for each system activation unless animation option is turned OFF by an external operation, and thus a user's understanding is enhanced, and thus leading to an intuitive understanding.

[Continuous Display Operation from Animation Display to See-Through Display]

By using the flowchart shown in FIG. 2, and the examples of image or picture shown in FIGS. 3-1 to 3-5, continuous display operation from animation display to see-through display is described.

Upon turning on the power of the side camera 1, the flow proceeds from step S1 to step S2, step S3, step S4, and step S5 in the flowchart in FIG. 2, and in step S5, the flow from step S3 to step S4, step S5 is repeated until it is determined that the elapsed time T from the camera power ON exceeds the initial stabilization time Tc. That is to say, until the elapsed time T exceeds the initial stabilization time Tc, the external point-of-view converted image data based on the camera image signal from the side camera 1 is not formed, the non-transparent vehicle cabin image based on the non-transparent vehicle cabin image data using the transparency Tra_N=0 is displayed on the monitor screen 21.

Then in step S5, when it is determined that the elapsed time T from the camera power ON exceeds the initial stabilization time Tc, the flow proceeds from step S5 to step S6 in the flowchart in FIG. 2. In step S6, the next transparency Tra_N (=Tra_N+ΔTra) is set by adding the preset transparency ΔTra to the current transparency Tra_N. That is to say, the transparency Tra_N=0 is updated to the transparency Tra_N=ΔTra. Until the set transparency Tra_N becomes greater than or equal to the initially set transparency Tra_0, the flow proceeds from step S6 to step S7, step S3, and step S4. The semi-transparent vehicle cabin image data is formed by using the set transparency Tra_N, and until the preset time for stepwise display Δt elapses, a composite image is displayed on the monitor screen 21, the composite image being formed by image data composition which superimposes the semi-transparent vehicle cabin image data on the external point-of-view converted image data.

Then when the preset time for stepwise display Δt elapses, the flow proceeds from step 4 to step S5, and step S6 in the flowchart in FIG. 2. In step S6, the next transparency Tra_N (2ΔTra) is set by adding the preset transparency ΔTra to the current transparency Tra_N. That is to say, the transparency Tra_N=ΔTra is updated to the transparency Tra_N=2ΔTra. Until the set transparency Tra_N becomes greater than or equal to the initially set transparency Tra_0, the flow proceeds from step S6 to step S7, step S3, and step S4. The semi-transparent vehicle cabin image data is formed by using the set transparency Tra_N, and until the preset time for stepwise display Δt elapses, a composite image is displayed on the monitor screen 21, the composite image being formed by image data composition which superimposes the semi-transparent vehicle cabin image data on the external point-of-view converted image data.

In this manner, addition of the preset transparency ΔTra to the current transparency Tra_N to obtain the next transparency Tra_N is repeated a plurality of times, and the semi-transparent vehicle cabin image data is made semi-transparent stepwise for each elapsed time of the preset time for stepwise display Δt. In step S7, when it is determined that the set transparency Tra_N is greater than or equal to the initialization transparency Tra_0, the animation display is terminated, and the flow proceeds to step S8, in which blind-spot image see-through display is performed automatically.

Figures 1, 3:
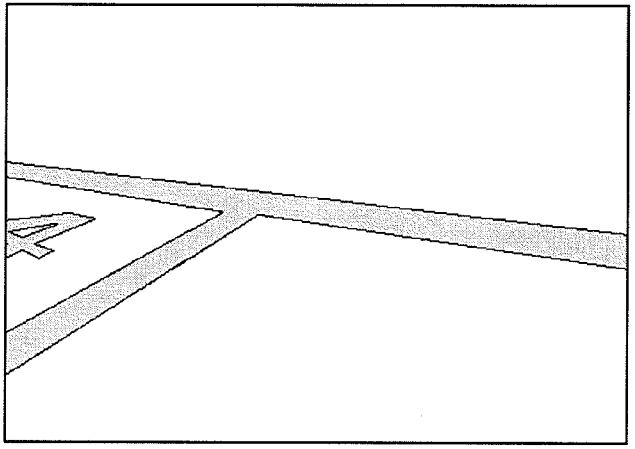
Figures 2, 3:
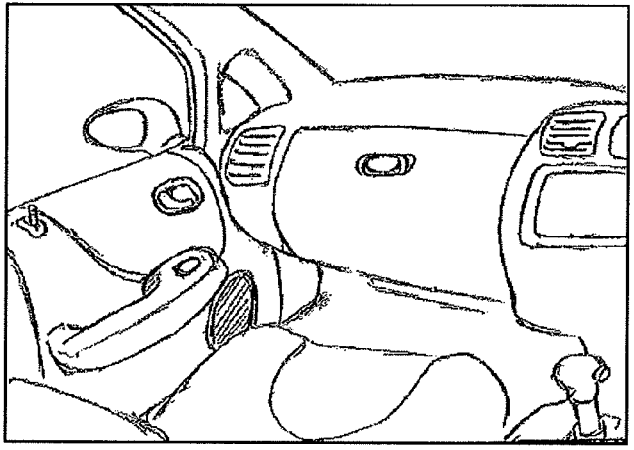
Figure 3:
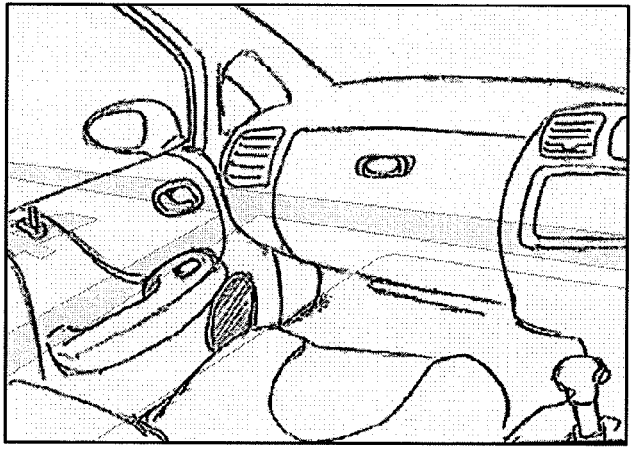

FIG. 3-1 is an external point-of-view converted image which is obtained by converting an image from the side camera 1 into an image that is viewed from a driver's position. FIG. 3-2 is a non-transparent vehicle cabin image that is viewed from the driver's point of view. In the previously proposed system, by using the blend function for performing semi-transparent composition of these two images using coefficient α (alpha value), the vehicle cabin image is changed to an image in a semi-see-through state, i.e., the semi-see-through image (3) shown in FIG. 3-5, which is displayed immediately.

Figures 3, 4:
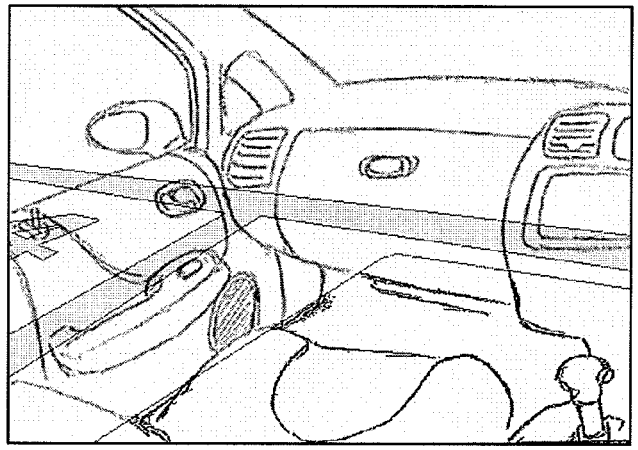
Figures 3, 4, 5:
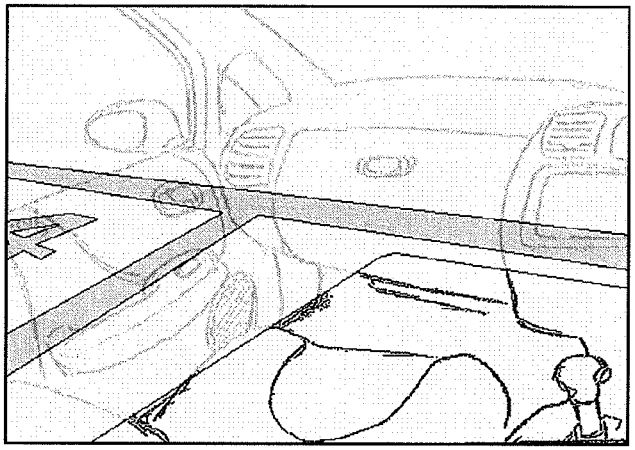
Figure 4:
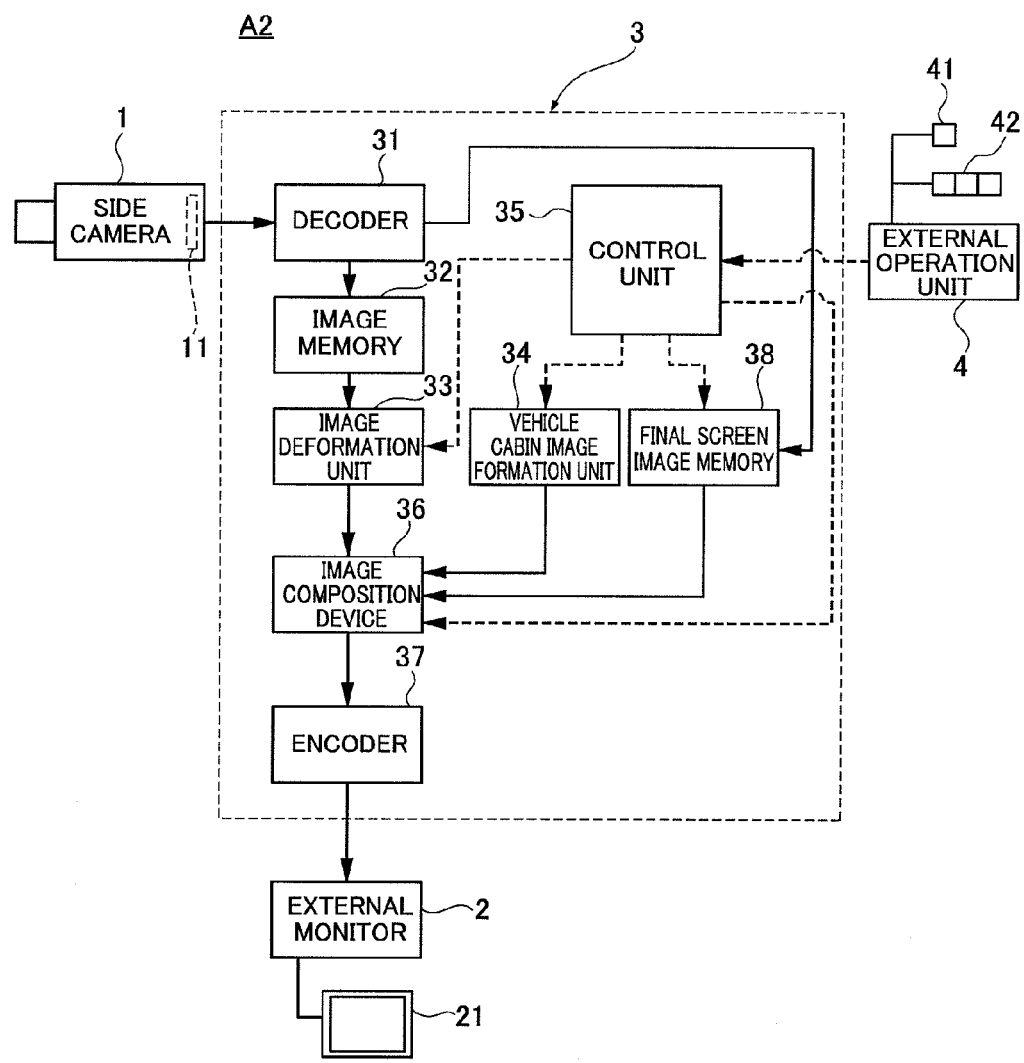
Figure 5:
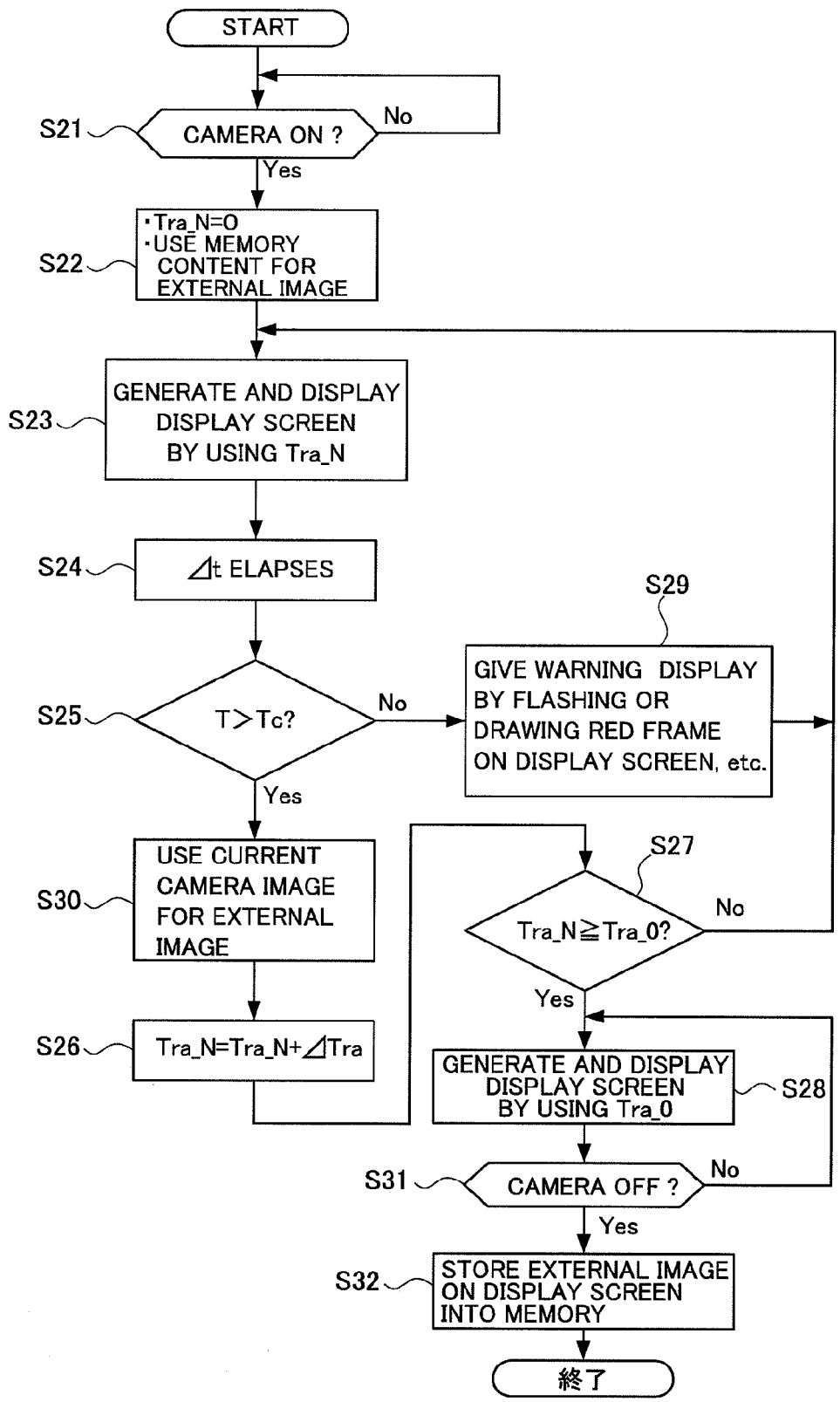

However, as described previously, when the monitor image of the semi-see-through image (3) shown in FIG. 3-5 is suddenly displayed, there exists a small number of users who don't understand that the door area is made see-through and semi-transparent. In view of this problem, it is intended to deepen a user's understanding by displaying the process in which the image is being formed.

First, as shown in the flowchart in FIG. 2, at the time of system activation (camera is ON), the non-transparent vehicle cabin image shown in FIG. 3-2 is displayed. In this system which requires the initial stabilization time Tc before the camera image itself becomes a stable image, after the initial stabilization time Tc elapses, the following operation starts.

After the initial stabilization time Tc elapses, the transparency of the vehicle cabin image is incremented by ΔTra for each elapsed time of the preset time for stepwise display Δt, which has been initially set. This operation is repeated until the transparency reaches the initially set transparency Tra_0, and in each repeat, a composite image which is formed by using the transparency Tra_N of calculated result is displayed. Consequently, the composite image changes from the non-transparent vehicle cabin image shown in FIG. 3-2, to the semi-see-through composite image (1) in which the external point-of-view converted image shown in FIG. 3-3 is seen through the vehicle cabin image with a transparency of approximately 20%, the semi-see-through composite image (2) in which the external point-of-view converted image shown in FIG. 3-4 is seen through the vehicle cabin image with a transparency of approximately 60%, and the semi-see-through composite image (3) in which the external point-of-view converted image shown in FIG. 3-5 is seen through the vehicle cabin image with the initially set transparency Tra_0. That is to say, continuous image (animation image) can be viewed in such a manner that the blind-spot image (external point-of-view converted image) gradually appears on the vehicle cabin image.

As shown above, in Embodiment 1, in addition to transparent display function for showing the blind-spot image through a semi-transparent image of the vehicle cabin, an animation display function is included for showing that the blind-spot image gradually appears on the image of the vehicle cabin by image processing which shifts the image of the vehicle cabin superimposed on the blind-spot image stepwise from a non-transparent image to a semi-transparent image.

Therefore, after the system activation operation, a user easily understands that the monitor image displayed on the external monitor 2 is the blind-spot image displayed through a semi-transparent image of the vehicle cabin. That is to say, the ultimate understanding of the semi-see-through image (3) is deepened, and thus producing an effect on enhancing subsequent intuitive recognition of the blind-spot image. Thus, the blind spot is eliminated, and contribution to the implementation of safe driving may be achieved.

Next, the effects are described. With the see-through side view monitor system A1 in Embodiment 1, the following effects may be achieved.

(1) The blind-spot image display system for vehicle (the see-through side view monitor system A1) includes: a camera (the side camera 1) configured to capture the surroundings of a vehicle, which are the blind spot from a driver; a monitor (the external monitor 2) set at a location in the vehicle cabin, which the driver can watch; and an image processing controller (the image processing control unit 3) configured to generate a monitor image signal for the monitor (external monitor 2) by image processing based on the real camera image signal inputted from the camera (the side camera 1), the image processing controller (the image processing control unit 3) having a blind-spot image formation unit (the image deformation unit 33) configured to perform point-of-view conversion on the real camera image signal inputted from the camera (the side camera 1) into the blind-spot image that is viewed from the position of the driver's point of view, a vehicle cabin image formation unit (the vehicle body image formation unit 34) configured to form the vehicle cabin image that is viewed from the position of the driver's point of view, a see-through display image generation unit (the image composition device 36, step S8 in FIG. 2) configured to render the vehicle cabin image to be superimposed on the blind-spot image into a semi-transparent vehicle cabin image, and an animation display image generation unit (the image composition device 36, steps S1 to S7 in FIG. 2) configured to generate an animation display image in which the vehicle cabin image to be superimposed on the blind-spot image is shifted stepwise from a non-transparent image to a see-through image. Thus, the blind-spot image display system for vehicle (the see-through side view monitor system A1) is provided that facilitates a user to understand that what is viewed from the position of the driver's point of view in the system is the blind-spot image through the semi-transparent image of the vehicle cabin, so that the blind spot is eliminated, and thus contribution to the implementation of safe driving may be achieved.

(2) Upon starting the animation display, the animation display image generation unit (the image composition device 36, steps S1 to S7 in FIG. 2) generates a display image for the monitor (the external monitor 2) by performing image composition on the blind-spot image which is acquired based on the real camera image inputted from the camera (the side camera 1), and the vehicle cabin image which is shifted from the non-transparent image at the start to a semi-transparent image stepwise by adding the preset transparency ΔTra to the transparency of the vehicle cabin image for every elapse of a preset time Δt. Thus, the animation display can be performed without any additional new components or configuration changes because the components (such as the image composition device 36) used by the see-through display of the blind-spot image may be used as they are, and only adding a blend processing algorithm which changes a non-transparent vehicle cabin image stepwise to a semi-transparent image.

(3) The external operation unit 4 having the system activation switch 41 is provided, and the animation display image generation unit (the image composition device 36, steps S1 to S7 in FIG. 2) starts an animation display upon turning on the system activation switch 41 with the intention of see-through display of the blind-spot image. Therefore, the stabilization period, which is a waiting time at the time of camera (the side camera 1) activation, may be utilized, and the animation display can be started automatically.

(4) The external operation unit 4 having the mode select switch 42 configured to switch between at least an animation display prohibited position and an animation manual display position is provided, and the animation display image generation unit (the image composition device 36, steps S1 to S7 in FIG. 2) starts an animation display upon switching from the animation display prohibited position to the animation manual display position by the mode select switch 42. Therefore, prohibition of the animation display can be selected by a user's intention, while the animation display can be started at any time in response to the user's display request.

(5) In the process of incrementing the transparency Tra_N of the vehicle cabin image stepwise, the animation display image generation unit (the image composition device 36, steps S1 to S7 in FIG. 2) terminates the animation display when the transparency Tra_N of the vehicle cabin image reaches the initially set transparency Tra_0, with which a semi-transparent vehicle cabin image is obtained in the see-through display image generation unit (the image composition device 36, step S8 in FIG. 2). Subsequent to the termination of the animation display, the see-through display image generation unit (the image composition device 36, step S8 in FIG. 2) automatically starts see-through display. Thus, the monitor display images are continuously expressed in from the termination region for the animation display to the start region for the blind-spot image see-through display without any sudden change, and thus preventing a sense of inconsistency from being given to a user.

(6) The blind-spot image displaying method for vehicle, which displays the blind-spot image on the monitor (the external monitor 2) based on the real camera image signal inputted from the camera (the side camera 1) to capture the surroundings of a vehicle, which is the blind spot from a driver, the blind-spot image displaying method for vehicle including: a system activation operation step for performing system activation operation with the intention of displaying the blind-spot image to the monitor (the external monitor 2); an animation display step for displaying an animation image on the monitor (the external monitor 2) triggered by the system activation operation, the animation image showing a flow of the blind-spot images that appears stepwise with the passage of time, through the vehicle cabin image which is initially in non-transparent state; and a see-through display step for displaying see-through blind-spot image on the monitor (the external monitor 2) triggered by the termination of the display of the animation image, the see-through blind-spot image being viewed from the position of the driver's point of view through a semi-transparent vehicle cabin image. Thus, the technique of displaying an image in non-transparent state to semi-transparent state in a continuously changing manner in use of the stabilization period at the time of camera activation, facilitates a user to understand that what is viewed from the position of the driver's point of view in the system is the blind-spot image through the semi-transparent image of the vehicle cabin, so that the blind spot is eliminated, and thus contribution to the implementation of safe driving may be achieved.

Embodiment 2

Embodiment 2 is an example in which at the time of animation display, a blind-spot image acquired by reading pre-stored information is used instead of the blind-spot image from the camera image.

First, the configuration is described. FIG. 4 is an overall system block diagram showing a see-through side view monitor system A1 in Embodiment 2 (an example of a blind-spot image display system for vehicle).

The see-through side view monitor system A2 in Embodiment 2 is an example which employs, as an image processing technique for animation presentation, a single layer semi-see-through technique which superimposes a vehicle cabin image with a transparency being changed stepwise, on the blind-spot image based on memory information. As shown in FIG. 4, the system A2 includes a side camera 1 (camera), an external monitor 2 (monitor), an image processing control unit 3 (image processing controller), and an external operation unit 4.

As shown in FIG. 4, the image processing control unit 3 includes a decoder 31, an image memory 32, an image deformation unit 33 (blind-spot image formation unit), a vehicle body image formation unit 34 (vehicle cabin image formation unit), a control unit (CPU) 35, an image composition device 36 (animation display image generation unit, see-through display image generation unit), an encoder 37, and a final screen image memory 38.

The final screen image memory 38 is a memory configured to store the blind-spot image at the time of camera OFF. The blind-spot image stored in the final screen image memory 38 is used, instead of the blind-spot image from the camera image, for the subsequent animation display during a period until the initial stabilization time Tc elapses since the camera is turned ON. Other configurations are similar to that of FIG. 1 in Embodiment 1, and thus corresponding components are labeled with the same reference symbols, and description is omitted.

FIG. 5 is a flowchart showing the flow of the animation display processing and the see-through display processing that are performed in the image processing control unit 3 in Embodiment 2. Hereinafter, each step in FIG. 5 is described. The step S21, and steps S24 to S28 performs similar processing to those in step S1, and steps S4 to S8, respectively, and thus description is omitted.

In step S22, subsequent to the camera power ON in step S1, the transparency of the semi-transparent vehicle cabin image data is set as Tra_N=0, while the memory content stored in the final screen image memory 38 is used as the external point-of-view converted image data, and the flow proceeds to step S2a.

In step S23, subsequent to the setting of Tra_N=0 and the external image using the memory content, or the warning display on the displayed screen in step S30, or the determination of Tra_N<Tra_0 in step 27, a semi-transparent vehicle cabin image data is formed using the set transparency Tra_N, and a monitor image signal is generated by image data composition, and is outputted to the external monitor 2, thereby displaying a composite image of an external point-of-view converted image and the semi-transparent vehicle cabin image on the monitor screen 21, the image data composition being performed by superimposing the semi-transparent vehicle cabin image data on the external point-of-view converted image data, then the flow proceeds to step S4. Until the elapsed time T from the camera power ON reaches the initial stabilization time Tc, there is no external point-of-view converted image data based on the camera image, and thus the composite image composed of the vehicle cabin image with a transparency of Tra_N=0, and the external point-of-view converted image data based on the external point-of-view converted image data stored at the time of previous camera OFF is displayed.

In step S29, subsequent to the determination of T≤Tc in step S25, a warning display is given by flashing and/or drawing a red frame on the displayed screen, etc., and the flow returns to step S23.

In step S30, subsequent to the determination of T>Tc in step S26, the external point-of-view converted image data based on the current camera image data from the side camera 1 is used as an external point-of-view converted image data, and the flow proceeds to step S26.

In step S31, subsequent to the display of a composite image on the monitor screen 21 in step S28, the composite image being composed of the external point-of-view converted image (blind-spot image) and the semi-transparent vehicle cabin image with the transparency of Tra_0, it is determined whether or not the power of the side camera 1 is OFF, and when the determination is YES (camera power OFF), the flow proceeds to step S32, otherwise when the determination is NO (camera power ON), the flow returns to step S28.

In step S32, subsequent to the determination of the camera power OFF in step S31, the external image (the final external point-of-view converted image data) on the display screen at the time of camera power OFF is taken into the final screen image memory 38, and the flow proceeds to the end.

Next, the operation is described.
[Continuous Display Operation from Animation Display to See-Through Display]

When the power of the side camera 1 is turned ON, the flow proceeds from step S21 to step S22, step S23, step S24, and step S25 in the flowchart in FIG. 5, and in step S25, the flow from step S23 to step S24, step S25, and step S25 is repeated until it is determined that the elapsed time T from the camera power ON exceeds the initial stabilization time Tc. That is to say, until the elapsed time T exceeds the initial stabilization time Tc, the external point-of-view converted image data based on the camera image signal from the side camera 1 is not formed, and thus, instead, a composite image is displayed on the monitor screen 21, the composite image being composed of the external point-of-view converted image data stored in the final screen image memory 38, and the vehicle cabin image data using the transparency Tra_N=0. However, while the elapsed time does not exceed the initial stabilization time Tc, the image data stored in the memory is used rather than the current camera image, and thus in step S29, it is warned that the current image is not a real time image, using an presentation method such as flashing, red frame display of the entire image displayed on the external monitor 2, or textual display.

Then in step S25, when it is determined that the elapsed time T from the camera power ON exceeds the initial stabilization time Tc, the flow proceeds from step S25 to step S30, and step S26 in the flowchart in FIG. 5. In step S30, the external point-of-view converted image is switched from the memory image to the camera image. In step S6, the next transparency Tra_N (=Tra_N+ΔTra) is set by adding the preset transparency ΔTra to the current transparency Tra_N, that is to say, the transparency Tra_N=0 is updated to the transparency Tra_N=ΔTra. Until the set transparency Tra_N becomes greater than or equal to the initially set transparency Tra_0, the flow proceeds from step S26 to step S27, step S23, and step S24. The semi-transparent vehicle cabin image data is formed by using the set transparency Tra_N, and until the preset time for stepwise display Δt elapses, a composite image is displayed on the monitor screen 21, the composite image being formed by image data composition which superimposes the semi-transparent vehicle cabin image data on the external point-of-view converted image data.

Then when the preset time for stepwise display Δt elapses, the flow proceeds from step S24 to step S25, step S30, and step 26 in the flowchart in FIG. 5. In step S26, the next transparency Tra_N (2ΔTra) is set by adding the preset transparency ΔTra to the current transparency Tra_N. That is to say, the transparency Tra_N=ΔTra is updated to the transparency Tra_N=2ΔTra. Until the set transparency Tra_N becomes greater than or equal to the initially set transparency Tra_0, the flow proceeds from step S26 to step S27, step S23, and step S24. The semi-transparent vehicle cabin image data is formed by using the set transparency Tra_N, and until the preset time for stepwise display Δt elapses, a composite image is displayed on the monitor screen 21, the composite image being formed by image data composition which superimposes the semi-transparent vehicle cabin image data on the external point-of-view converted image data.

In this manner, addition of the preset transparency ΔTra to the current transparency Tra_N to obtain the next transparency Tra_N is repeated, and the semi-transparent vehicle cabin image data is made semi-transparent stepwise for every elapse of the preset time Δt for stepwise display. In step S27, when it is determined that the set transparency Tra_N is greater than or equal to the initially set transparency Tra_0, the animation display is terminated, and the flow proceeds to step S28, S31, in which blind-spot image see-through display is continued until it is determined that the camera power is OFF.

Then when it is determined that the camera power is OFF in step S31, the flow proceeds to step S32, and the external image (the final external point-of-view converted image data) of the display screen at the time of the camera power OFF is taken into the final screen image memory 38, and the processing is terminated.

In this manner, until the elapsed time T exceeds the initial stabilization time Tc, there is no external point-of-view converted image data based on the camera image, and thus during this period, the animation operation based on image composition cannot be performed. On the other hand, in Embodiment 2, the animation operation based on image composition can be performed before the initial stabilization time Tc elapses. That is to say, the continuous animation operation of semi-see-through image is intended to deepen a driver's understanding of the see-through side view system, and thus, in the step of the final screen shown in the semi-see-through image (3) in FIG. 3-5, it is sufficient to display an accurate external camera image. In other words, during the animation operation, a real-time blind-spot image based on the camera image does not need to be displayed.

Taking this point into consideration, the image in use when the camera system is turned OFF is stored in the final screen image memory 38 (step S32), and is utilized as the external point-of-view image (blind-spot image) in the start region for the animation display (step S22). In this case, similarly to Embodiment 1, the transparency Tra_N is incremented for each preset time Δt (step S26), and image display is performed stepwise until the transparency Tra_N finally reaches the initially set transparency Tra_0. Now after the initial stabilization time Tc elapses, the camera image itself is stabilized and becomes available, and thus is displayed by using the external camera image (step S30). Other operations are similar to those in Embodiment 1, and thus description is omitted.

Next, the effects are described. With the see-through side view monitor system A2 in Embodiment 2, the following effects can be obtained in addition to the effects (1) to (6) in Embodiment 1.

(7) The animation display image generation unit (the image composition device 36, FIG. 5) generates a display image for the monitor (the external monitor 2) by using the blind-spot image acquired by reading the pre-stored memory information, until the initial stabilization time Tc elapses since the time of the camera (the side camera 1) power ON. Therefore, before the initial stabilization time Tc elapses, the animation operation based on the composite image composed of the blind-spot image and the vehicle cabin image can be started simultaneously when the power of the camera (the side camera 1) is turned ON.

Embodiment 3

In contrast to embodiments 1 and 2 which each employ the single layer semi-see-through technique, Embodiment 3 is an example which employs a planar layer semi-see-through technique for animation presentation.

Figure 6:
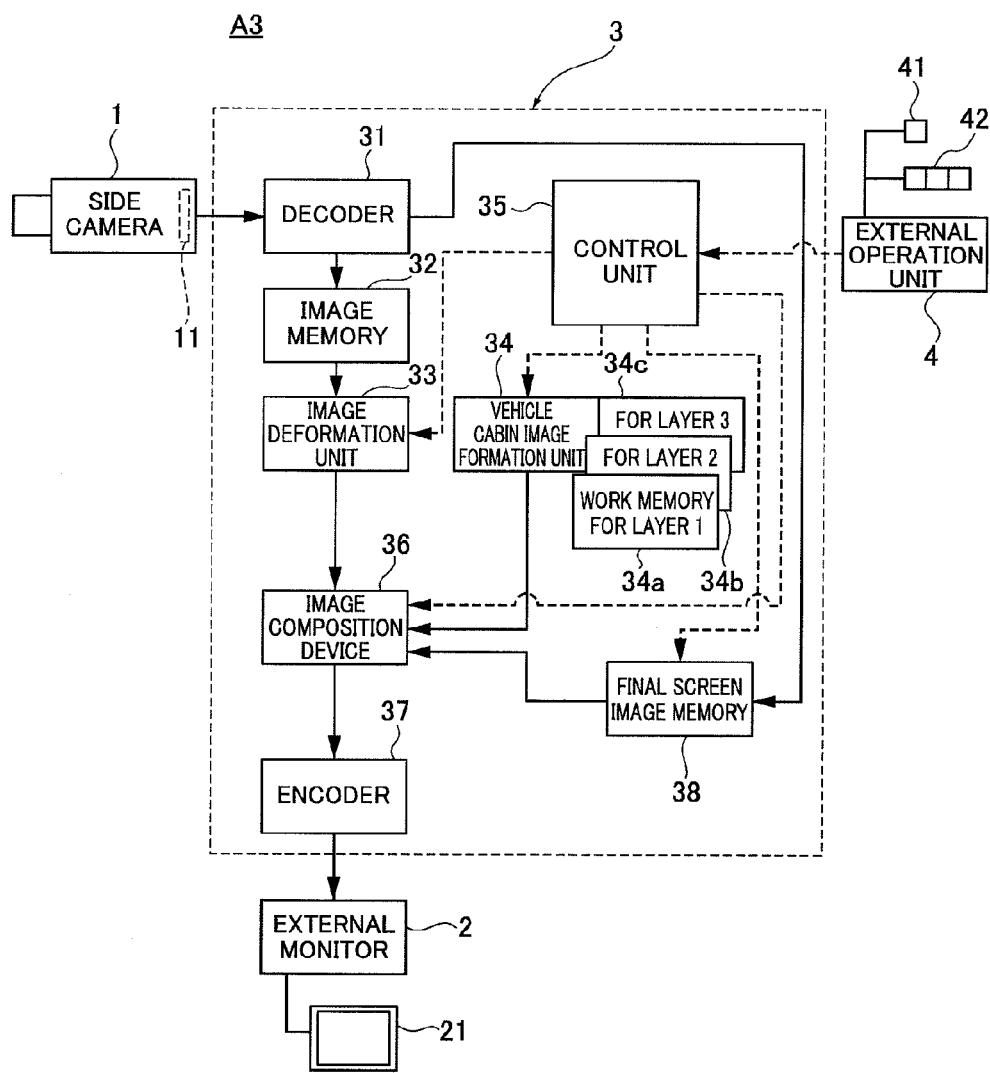
FIG. 6 is an overall system block diagram showing a see-through side view monitor system A3 in Embodiment 3 (an example of a blind-spot image display system for vehicle).

First, the configuration is described. FIG. 6 is an overall system block diagram showing a see-through side view monitor system A3 in Embodiment 3 (an example of a blind-spot image display system for vehicle).

The see-through side view monitor system A3 in Embodiment 3 is an example which employs, as an image processing technique for animation presentation, a semi-see-through technique which has a plurality of layers in a stepwise exploded structure, and presents animation with a transparency being changed per layer (the semi-see-through technique is an image composition technique which superimposes multiple sheets of a vehicle cabin image with their transparencies being changed stepwise, on the original blind-spot image, and thus hereinafter, referred to as a multiple layer semi-see-through technique). As shown in FIG. 6, the system A3 includes a side camera 1 (camera), an external monitor 2 (monitor), an image processing control unit 3 (image processing controller), and an external operation unit 4.

As shown in FIG. 6, the image processing control unit 3 includes a decoder 31, an image memory 32, an image deformation unit 33 (blind-spot image formation unit), a vehicle body image formation unit 34 (vehicle cabin image formation unit), a control unit (CPU) 35, an image composition device 36 (animation display image generation unit, see-through display image generation unit), an encoder 37, and a final screen image memory 38.

Embodiment 3 has a configuration in which the vehicle body image formation unit 34 includes additional image memories capable of supporting multiple layers. Here, Embodiment 3 employs a system with a four-layered structure, which has a layer 1, a layer 2, and a layer 3 as see-through image layers, and has a layer 4 as an external point-of-view converted image. (see FIG. 7-5).

That is to say, the vehicle body image formation unit 34 includes, as image memories, additional memories of a work memory 34a for the layer 1, a work memory 34b for the layer 2, and a work memory 34c for the layer 3. As shown in FIG.

Figures 1, 7:
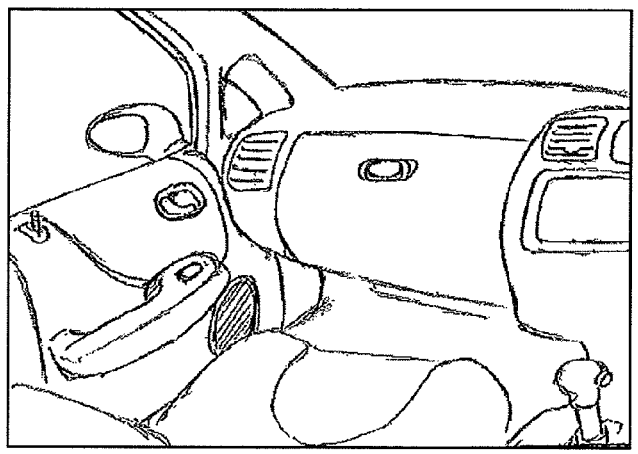
Figures 2, 7:
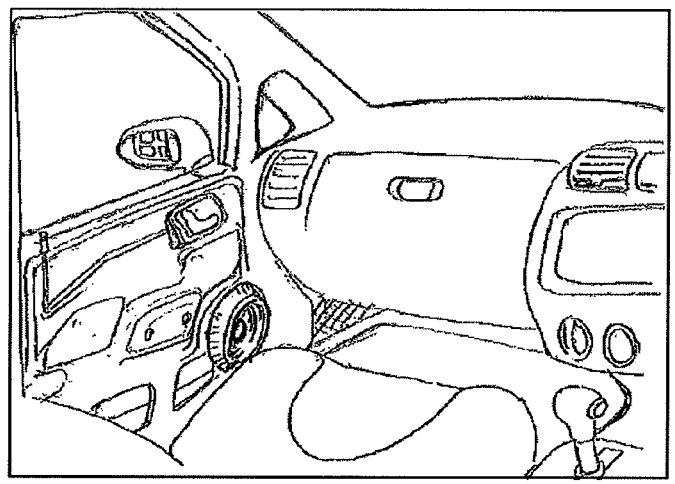
Figures 3, 7:
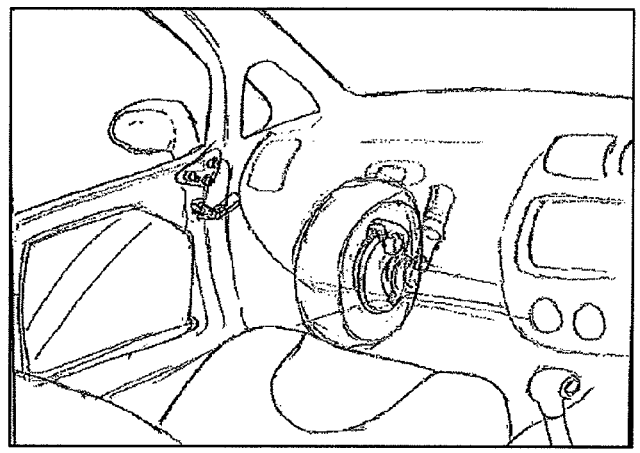
Figures 4, 7:
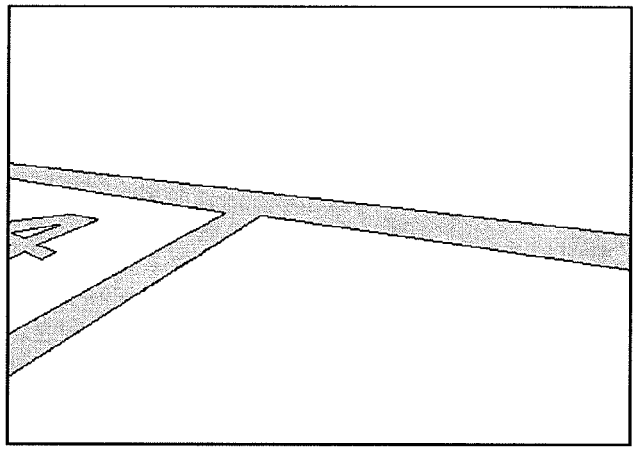
Figures 5, 7:
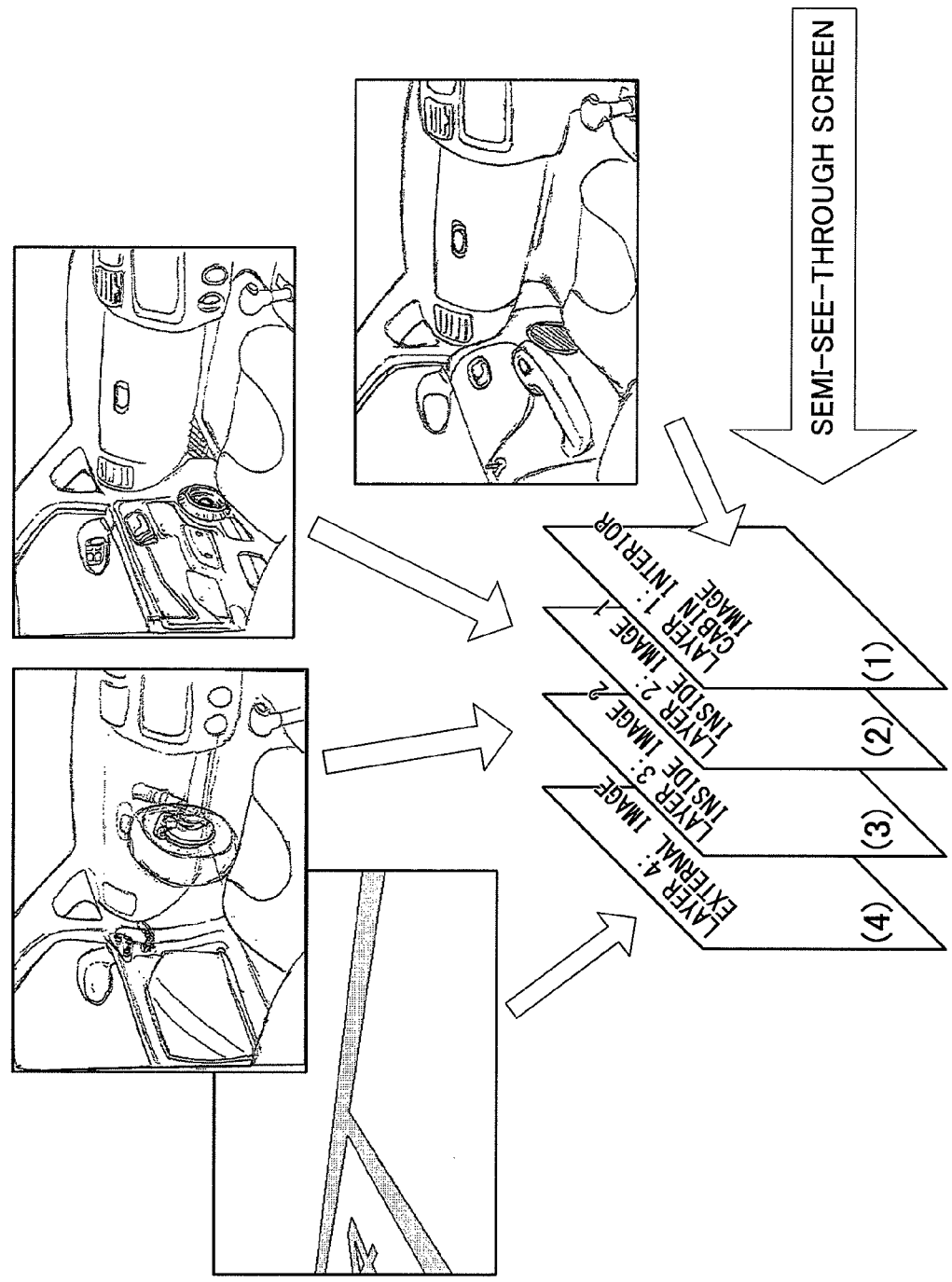

7-1, a vehicle cabin image for the layer 1 with a transparency of 0 is stored in the work memory 34a for the layer 1. As shown in FIG. 7-2, a door inside image for the layer 2 (1) with a transparency of 0 is stored in the work memory 34b for the layer 2. As shown in FIG. 7-3, a door inside image for the layer 3 (2) with a transparency of 0 is stored in the work memory 34c for the layer 3.

In addition, as shown in FIG. 7-4, the image deformation unit 33 has a layer set therein, on which an external point-of-view converted image is generated. Then as shown in FIG. 7-5, the images on these four layers are conceptually different, and a blending between multiple layers is performed by using respective transparencies defined on the layers, and consequently forming an image of the semi-see-through state.

Similarly to Embodiment 2, the final screen image memory 38 is a memory configured to store a blind-spot image when the camera is OFF. The blind-spot image stored in the final screen image memory 38 is used, instead of the blind-spot image from the camera image, for the subsequent animation display during a period until the initial stabilization time Tc elapses since the camera is turned ON. Other configurations are similar to that of FIG. 1 in Embodiment 1, and thus corresponding components are labeled with the same reference symbols, and description is omitted.

Next, the operation is described.

[Continuous Display Operation from Animation Display to See-Through Display]

The single layer semi-see-through technique in embodiments 1 and 2 displays animated images with a gradually increased transparency by using the system having a structure of two layers of an external image and a vehicle cabin image. On the other hand, the multiple layer semi-see-through technique in Embodiment 3 displays more real see-through images by using not only vehicle cabin images, but also stepwise exploded images of the inside of a door and/or an instrument panel.

Figures 1, 8:
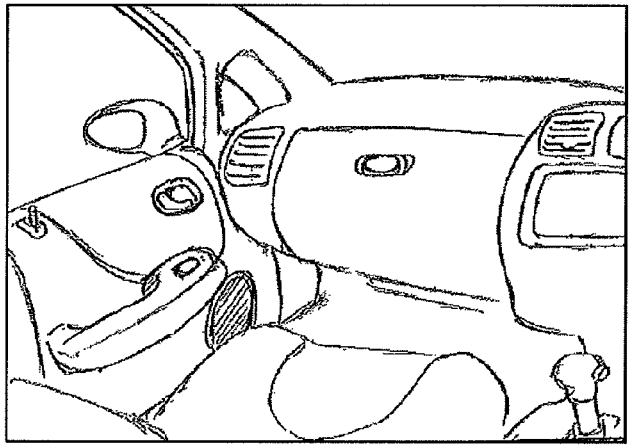
Figures 2, 8:
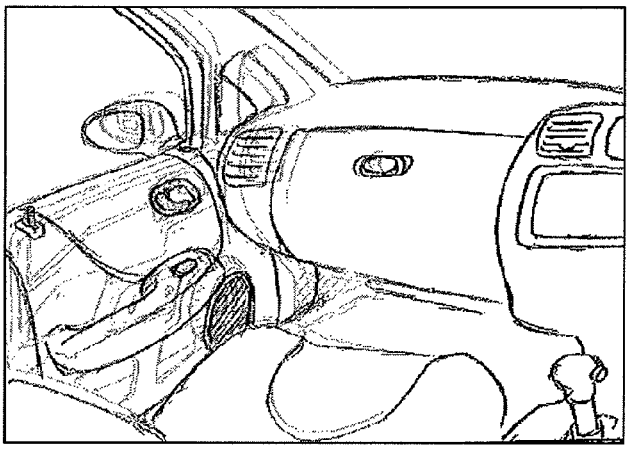
Figures 3, 8:
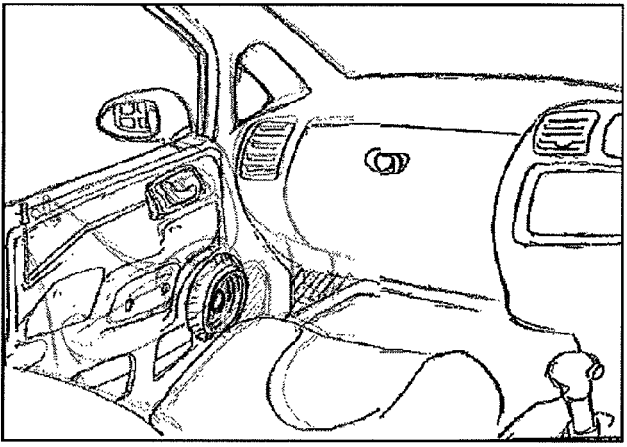
Figures 4, 8:
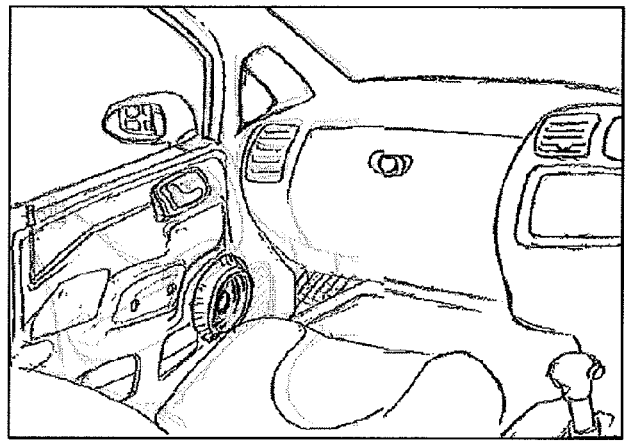
Figures 5, 8:
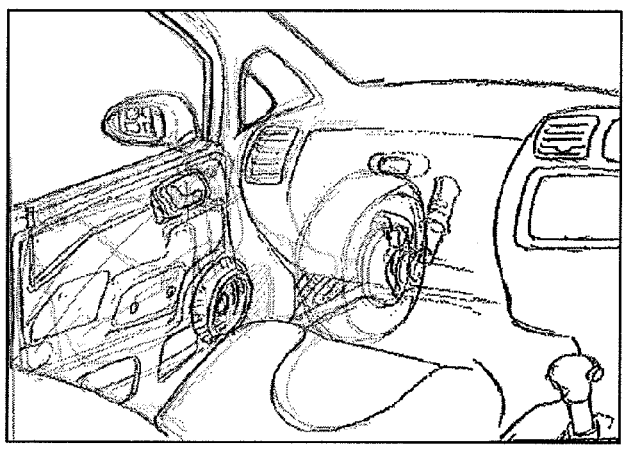
Figures 6, 8:
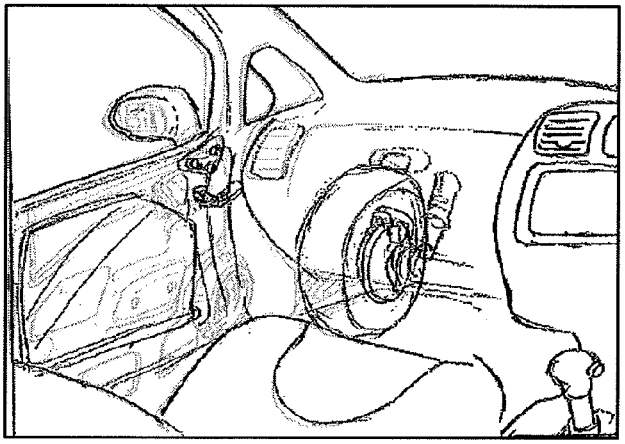
Figures 7, 8:
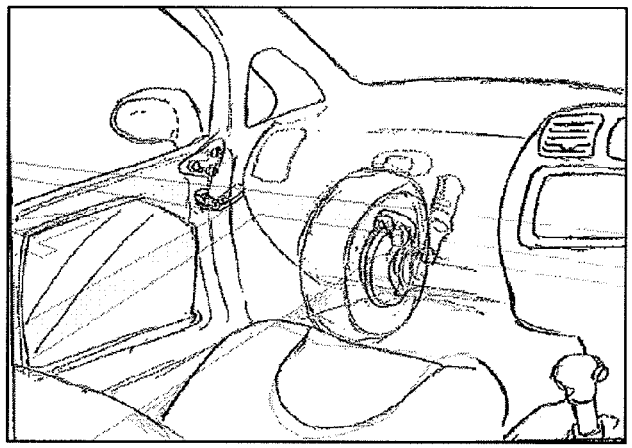
Figure 8:
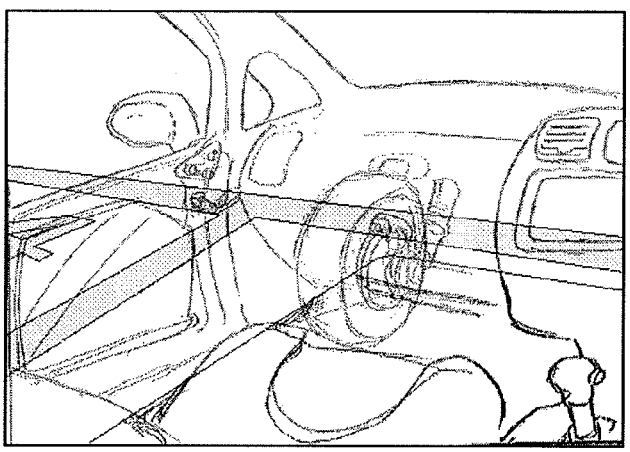
Figures 8, 9:
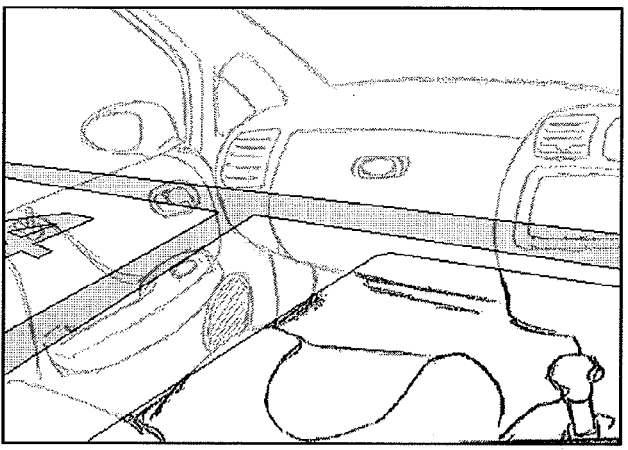
Figure 9:
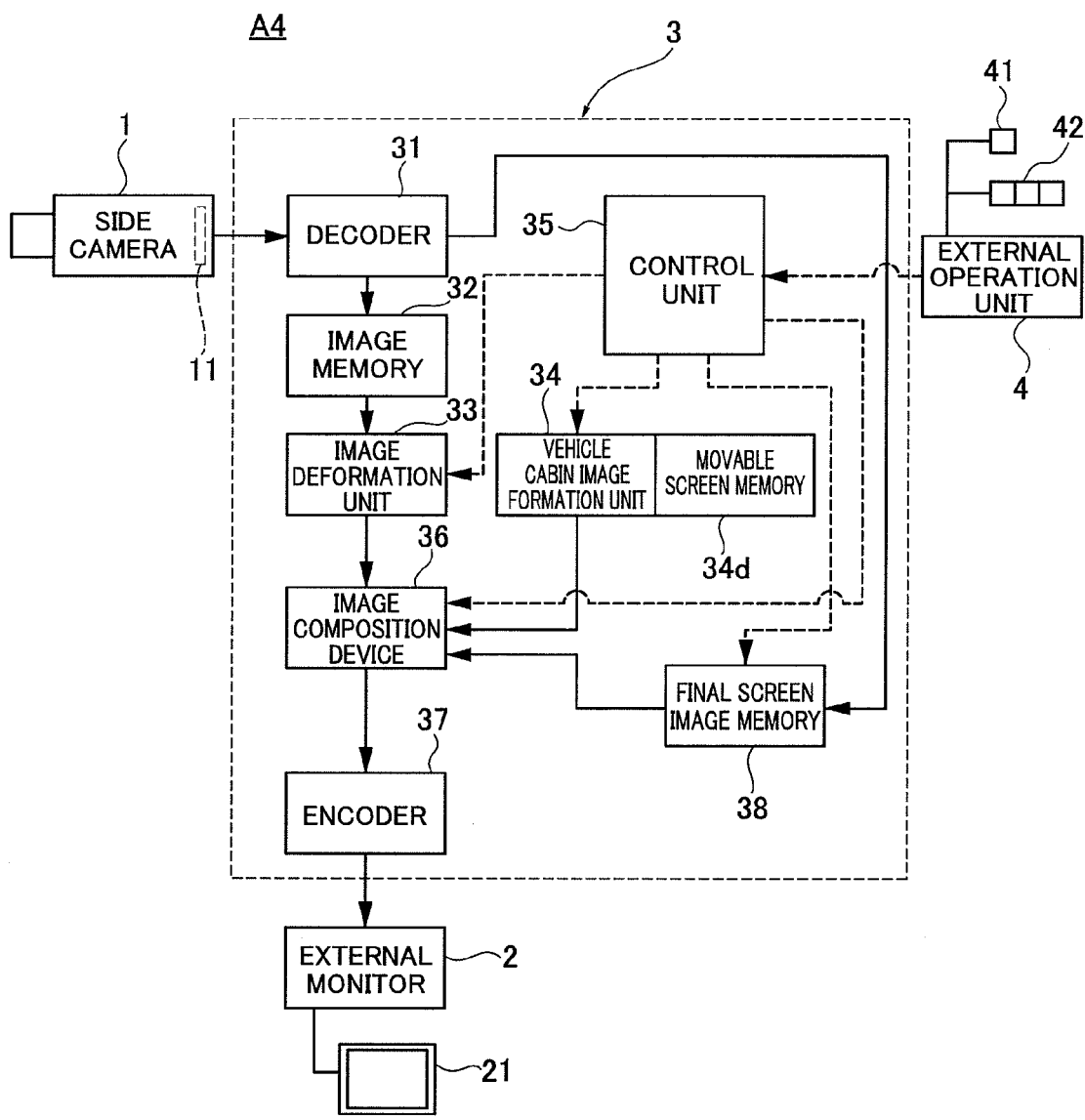

FIGS. 8-1 to 8-9 show the operation image. The numerical values of (1) to (4) in the figures are assumed to describe the respective layers in FIG. 7-5. At first, as shown in FIG. 8-1, the layer (1) starts to display a vehicle cabin image having a non-transparency of 100% (transparency of 0%). Then, the respective transparencies of the layer (1) and the layer (2) as the subsequent layer are changed stepwise so that a door inside image (1) on the layer (2) is displayed through a vehicle cabin image on the layer (1). That is to say, in the second step, as shown in FIG. 8-2, the vehicle cabin image on the layer (1) is displayed with a non-transparency of 80%, and the door inside image (1) on the layer (2) is displayed with a non-transparency of 20%. In the third step, as shown in FIG. 8-3, the vehicle cabin image on the layer (1) is displayed with a non-transparency of 30%, and the door inside image (1) on the layer (2) is displayed with a non-transparency of 70%. In the fourth step, as shown in FIG. 8-4, the vehicle cabin image on the layer (1) is displayed with a non-transparency of 10%, and the door inside image (1) on the layer (2) is displayed with a non-transparency of 90%.

Then the respective transparencies of the current layer (2) and the subsequent inner layer (3) are changed so that the door inside image (2) on the layer (3) is displayed through the door inside image (1) on the layer (2). That is to say, in the fifth step, as shown in FIG. 8-5, the vehicle cabin image on the layer (1) is displayed with a non-transparency of 10%, the door inside image (1) on the layer (2) is displayed with a non-transparency of 70%, and the door inside image (2) on the layer (3) is displayed with a non-transparency of 20%. In the sixth step, as shown in FIG. 8-6, the door inside image (1) on the layer (2) is displayed with a non-transparency of 20%, and the door inside image (2) on the layer (3) is displayed with a non-transparency of 80%.

Then the respective transparencies of the current layer (3) and the subsequent inner layer (4) are changed so that the external point-of-view converted image on the layer (4) is displayed through the door inside image (2) on the layer (3). That is to say, in the seventh step, as shown in FIG. 8-7, the door inside image (2) on the layer (3) is displayed with a non-transparency of 70%, and the external point-of-view converted image on the layer (4) is displayed with a non-transparency of 30%. In the eighth step, as shown in FIG. 8-8, the door inside image (2) on the layer (3) is displayed with a non-transparency of 30%, and the external point-of-view converted image on the layer (4) is displayed with a non-transparency of 70%.

And finally, when the external point-of-view converted image on the layer (4), which is the outside image, becomes the main layer to be displayed, the door inside image (2) on the layer (3) is replaced by the vehicle cabin image on the layer (1). Thus, as shown in FIG. 8-9, a normal see-through side view screen is displayed based on the vehicle cabin image on the layer (1) having a non-transparency of 15%, and the external point-of-view converted image on the layer (4) having a non-transparency of 85%.

As described above, compared with the single layer semi-see-through technique in embodiments 1 and 2, Embodiment 3 employs a technique to generate a transparent image utilizing a multi-layer structure, and thus providing persuasive presentation and enhancing a user's understanding of the composite image and facilitating a user to intuitively understand the system. In Embodiment 3, formation of a semi-see-through image by a blending performed only between adjacent layers has been described, however, without being limited to this formation, an image may be formed by performing the blending between three or more types of layers. In addition, as shown in FIG. 5 in Embodiment 2, the above operations are displayed during the initial stabilization time Tc which is a start-up delay time of the camera, and thus providing an effect on reducing user's irritation which may occur before the start-up is completed. Other operations are similar to those in Embodiment 1, and thus description is omitted.

Next, the effects are described. With the see-through side view monitor system A3 in Embodiment 3, the following effects can be obtained in addition to the effects (1), (3) to (5), and (7) in Embodiment 1.

(8) the animation display image generation unit (the image composition device 36) prepares a plurality of layers containing the vehicle cabin image and the blind-spot image, and sets, as a source image, a layer structure obtained by combining the plural layers stepwise, from the vehicle cabin image to the blind-spot image, and then upon starting the animation display, generates a display image by image composition using varied transparencies for the respective layers, the display image being changed stepwise from a non-transparent vehicle cabin image at start to a blind-spot image seen through the vehicle cabin image. Therefore, compared with the single layer semi-see-through technique, this technique provides more persuasive presentation and enhances a user's understanding of the composite image and facilitates a user to intuitively understand the system.

Embodiment 4

Embodiment 4 shows an example of a three-dimensional semi-see-through technique which forms a semi-see-through image in such a manner that each component is presented three-dimensionally using spatial information are cut into sections like a cut model.

First, the configuration is described. FIG. 9 is an overall system block diagram showing a see-through side view monitor system A4 in Embodiment 4 (an example of a blind-spot image display system for vehicle).

The see-through side view monitor system A4 in Embodiment 4 is an example which employs, as an image processing technique for animation presentation, a three-dimensional semi-see-through technique which captures the vehicle parts three-dimensionally using spatial information, while setting a virtual screen to vertically cut the three-dimensional vehicle parts and moving the screen to the outer side stepwise, so that the inner image which is cut off by the screen is displayed as a semi-transparent image and the outer image is displayed as a non-transparent image. As shown in FIG. 9, the system A4 includes a side camera 1 (camera), an external monitor 2 (monitor), an image processing control unit 3 (image processing controller), and an external operation unit 4.

As shown in FIG. 9, the image processing control unit 3 includes a decoder 31, an image memory 32, an image deformation unit 33 (blind-spot image formation unit), a vehicle body image formation unit 34 (vehicle cabin image formation unit), a control unit (CPU) 35, an image composition device 36 (animation display image generation unit, see-through display image generation unit), an encoder 37, and an final screen image memory 38.

The vehicle body image formation unit 34 presents each component three-dimensionally by using spatial information such as 3D-CAD data. For example, each three-dimensionally presented component is rendered on the entire screen as a texture of the component image, and a door speaker and a metal plate as a material for an internal structure are disposed inside a door's interior, with spatial positional relationship between the components also being taken into consideration.

The vehicle body image formation unit 34 includes an additional component of a movable screen memory 34d. The movable screen memory 34d has a screen, which is formed as a virtual plane or a virtual curved surface, and is vertically disposed away by a predetermined distance from a driver's point of view (virtual point of view) in the vehicle cabin.

Then the screen which moves to the outer side stepwise serves as a trigger for see-through screen display, and cuts three-dimensionally presented vehicle structure by the screen being formed as a virtual plane or a virtual curved surface so that the image which is inner with respect to the cross-section is displayed as a see-through image and the outer image is displayed as a non-transparent image.

Similarly to Embodiment 2, the final screen image memory 38 is a memory configured to store a blind-spot image when the camera is OFF. The blind-spot image stored in the final screen image memory 38 is used, instead of the blind-spot image from the camera image, for the subsequent animation display during a period until the initial stabilization time Tc elapses since the camera is turned ON. Other configurations are similar to that of FIG. 1 in Embodiment 1, and thus corresponding components are labeled with the same reference symbols, and description is omitted.

Next, the operation is described.

[Continuous Display Operation from Animation Display to See-Through Display]

The technique of Embodiment 3 obtains a composite image by blending adjacent layers while changing the respective transparencies of the entire layers, and thus, so to speak, is a two-dimensional technique of layer type. On the other hand, the technique of Embodiment 4 presents each component three-dimensionally by using spatial information such as 3D-CAD data, and forms a semi-see-through image in such a manner that the component is cut into sections like a cut model.

Figure 10:
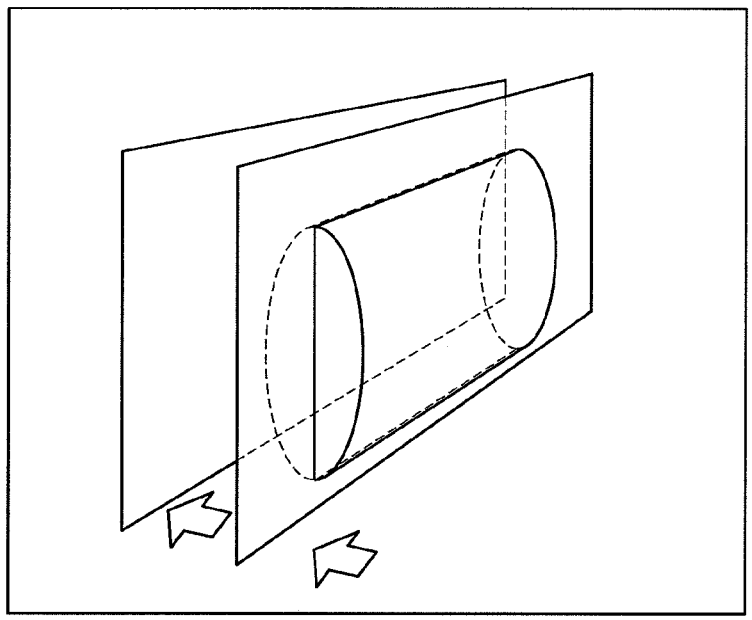
FIG. 10 is a perspective view showing a three-dimensional see-through image forming a semi-transparent image in such a manner that components which are presented three-dimensionally using spatial information are cut into sections like a cut model, in the see-through side view monitor system A4 in Embodiment 4.

Specifically, as shown in FIG. 10, by rendering spatial shape data, the inner portion of the cut sections three dimensional component is cut off so that the inside is visible. By moving the slicing section to the outer side stepwise, respective semi-see-through images are consequently obtained.

First, a screen as a virtual plane or a virtual curved surface is vertically disposed away by a predetermined distance from a driver's point of view (virtual point of view) in the vehicle cabin. After the three-dimensional component is cut by the screen, which serves as a trigger for see-through screen display, the image which is inner with respect to the cross-section is displayed as a see-through image and the outer image is displayed as a non-transparent image. Each three-dimensionally presented component is rendered on the entire screen as a texture of the component image, and a door speaker and a metal plate as a material for an internal structure are disposed inside the door's interior, with spatial positional relationship between the components also being taken into consideration. Thus when part of the door's interior is cut by the screen so as to be transparent, the screen display is presented in such a manner that an internal speaker and the like can be seen transparently through the cross section. The virtual plane is moved to the outer side stepwise.

Consequently, a see-through image is formed with several sheets of texture overlapped in the shape of annual rings when an onion is vertically cut. In this manner, an animation presentation is provided in such a manner that the vehicle structure captured as a three-dimensional object is cut into sections by the screen. Therefore, compared with the single layer semi-see-through technique in Embodiments 1 and 2, this technique provides more persuasive presentation and enhances a user's understanding of the composite image and facilitates a user to intuitively understand the system.

Here, together with the operation of an external sensor, the current positional relationship of movable parts such as a turning angle of a tire, tilt of a mirror, and a position of a window glass may be three-dimensionally recreated and displayed, then the above see-through processing may be applied to the screen display of the positional relationship. For the sake of simplicity, the component parts to be cut into sections may be roughly shown, and the components may be formed by rendering as textures only the images of a plurality of layers described in Embodiment 3. That is to say, in the case where there is three-dimensional spatial information of contour corresponding to a group of parts in the layer images, a configuration may be adopted in which the layer images for the three-dimensional objects may be rendered as textures on the frontal side, and the rendered layer images may be cut into sections by a vertical plane. Other operations are similar to those in Embodiment 1, and thus description is omitted.

Next, the effects are described. With the see-through side view monitor system A4 in Embodiment 4, the following effects can be obtained in addition to the effects (1), (3) to (5), and (7) in Embodiment 1.

(9) the animation display image generation unit (the image composition device 36) renders three-dimensional information to the vehicle cabin image, and sets a virtual planar or curved screen to cut off the three-dimensional vehicle cabin image with the screen being moved from the inner side to the outer side of the vehicle cabin, and upon starting the animation display, starts to move the screen from the inner side to the outer side stepwise while respectively making semi-transparent and non-transparent the inner image and the outer image which are cut off by the screen during the movement, thereby generating a display image which is changed stepwise from a non-transparent vehicle cabin image at the start time to a blind-spot image seen through the vehicle cabin image. Therefore, compared with the single layer semi-see-through technique, this technique provides more persuasive presentation and enhances a user's understanding of the composite image and may facilitate a user to intuitively understand the system.

So far, the blind-spot image display system for vehicle and the blind-spot image display method for vehicle of the present invention have been described based on embodiments 1 to 4, however, specific configuration is not limited to these embodiments, and as long as not departing from the spirit of the invention according to each claim in the annexed claims, modification or addition to the described design is allowed.

Embodiments 1 to 4 show examples of means that enhance a user's understanding of the system only by the monitor image. However, a configuration may be adopted in which, a voice description added technique which adds voice description to the monitor image formation technique in each example of embodiments 1 to 4, and thus enhancing a user's understanding of the system by both the monitor image and the voice description.

Embodiments 1 to 4 show examples in which the external operation unit 4 has the system activation switch 41 and the mode select switch 42. However, the external operation unit 4 may have, for example, a function that allows a user to manually adjust the initial transparency of the vehicle cabin image at the user's own discretion. Alternatively, the external operation unit 4 may have, for example, a function that allows a user to manually adjust the hue of the entire vehicle cabin image to be superimposed at the user's own discretion.

Embodiments 1 to 4 show examples of a see-through side view monitor system that uses, as a vehicle surrounding image display system, a side camera to acquire the image of a blind-spot area on the left side of the vehicle. However, an example of a see-through back view monitor system may be adopted that uses a back camera to acquire the image of a blind-spot area in the back of the vehicle. Alternatively, an example of a see-through font view monitor system may be adopted that uses a front camera to acquire the image of a blind-spot area in the front of the vehicle. In addition, an example of a see-through around view monitor system may be adopted that uses an all around camera to acquire the image of a blind-spot area all around the vehicle. Furthermore, the vehicle surrounding image display system may be applied to a monitor system capable of selecting any one of the side view, the back view, and the front view with an external monitor being shared, or to a monitor system capable of automatically selecting one of those views under a predetermined condition.

CROSS-REFERENCE TO RELATED APPLICATIONS

The present application claims priority from Japanese Patent Application No. 2009-164726 filed on Jul. 13, 2009, the entire disclosures of which are hereby incorporated by reference.

The invention claimed is:

1. A blind-spot image display system for a vehicle, said blind-spot image display system comprising:
a camera configured to capture surroundings of a vehicle, the surroundings being a blind spot from a driver;
a monitor set at a location in a cabin of the vehicle; and
an image processing controller configured to generate a monitor image signal for the monitor by image processing based on a real camera image signal inputted from the camera, the image processing controller including:
a blind-spot image formation unit configured to perform point-of-view conversion on the real camera image signal inputted from the camera into a blind-spot image that is viewed from a position of the driver's point of view;
a vehicle cabin image formation unit configured to form a vehicle cabin image that is viewed from the position of the driver's point of view;
a see-through display image generation unit configured to render the vehicle cabin image to be superimposed on the blind-spot image into a semi-transparent vehicle cabin image; and
an animation display image generation unit configured to generate an animation display image in which the vehicle cabin image to be superimposed on the blind-spot image is shifted stepwise from a non-transparent image to a see-through image;
wherein said camera, said monitor, and said image processing controller are configured and interconnected such that, upon starting an animation display, the animation display image generation unit generates a display image for the monitor by image composition on the blind-spot image which is acquired based on the real camera image signal inputted from the camera, and the vehicle cabin image which is shifted from a non-transparent image at start to a semi-transparent image stepwise by adding a preset transparency to a transparency of the vehicle cabin image for every elapse of a preset time.

2. The blind-spot image display system for a vehicle according to claim 1,
wherein the animation display image generation unit is configured to generate a display image for the monitor by using the blind-spot image acquired by reading pre-stored memory information, until an initial stabilization time elapses since the time of the camera power ON.

3. The blind-spot image display system for a vehicle according to claim 1,
wherein the animation display image generation unit is configured to prepare a plurality of layers containing the vehicle cabin image and the blind-spot image, and to set, as a source image, a layer structure obtained by combining the layers stepwise, from the vehicle cabin image to the blind-spot image, and then upon starting an animation display, to generate a display image by image composition using varied transparencies for the respective layers, the display image being changed stepwise from a non-transparent vehicle cabin image at start to a blind-spot image seen through the vehicle cabin image.

4. The blind-spot image display system for a vehicle according to claim 1,
wherein the animation display image generation unit is configured to render three-dimensional information to the vehicle cabin image, and to set a virtual planar or curved screen to cut off the three-dimensional vehicle cabin image with the screen being moved from an inner side to an outer side of the cabin of the vehicle, and
the animation display image generation unit is further configured to, upon starting an animation display, start to move the screen from an inner side to an outer side stepwise while respectively making semi-transparent and non-transparent an inner image and an outer image which are cut off by the screen during the movement, thereby generating a display image which is changed stepwise from a non-transparent vehicle cabin image at start to a blind-spot image seen through the vehicle cabin image.

5. The blind-spot image display system for a vehicle according to claim 1,
further comprising an external operation unit having a system activation switch, and
the animation display image generation unit is configured to start an animation display upon turning on the system activation switch with an intention of see-through display of the blind-spot image.

6. The blind-spot image display system for a vehicle according to claim 1,
further comprising an external operation unit having a mode select switch configured to switch between at least an animation display prohibited position and an animation manual display position, and
the animation display image generation unit is configured to start an animation display upon switching from the animation display prohibited position to the animation manual display position by the mode select switch.

7. The blind-spot image display system for a vehicle according to claim 1,
wherein in a process of incrementing a transparency of the vehicle cabin image stepwise, the animation display image generation unit is configured to terminate the animation display when the transparency of the vehicle cabin image reaches an initially set transparency, with which a semi-transparent vehicle cabin image is obtained in the see-through display image generation unit, and
subsequent to the termination of the animation display, the see-through display image generation unit is configured to automatically start see-through display.

8. A blind-spot image display method for a vehicle, for displaying a blind-spot image on a monitor based on a real camera image signal inputted from a camera to capture surroundings of a vehicle, the surroundings being a blind spot from a driver, the method comprising:
a system activation operation procedure of performing system activation operation with an intention of displaying a blind-spot image to the monitor;
an animation display procedure of displaying an animation image on the monitor, the animation display procedure being triggered by the system activation operation, the animation image showing a flow of the blind-spot images that appears stepwise with a passage of time, through a vehicle cabin image which is initially in a non-transparent state;
an animation display image generation procedure of generating, upon starting an animation display, a display image for the monitor by image composition on the blind-spot image which is acquired based on the real camera image signal inputted from the camera, and the vehicle cabin image which is shifted from a non-transparent image at start to a semi-transparent image stepwise by adding a preset transparency to a transparency of the vehicle cabin image for every elapse of a preset time; and
a see-through display procedure of displaying a see-through blind-spot image on the monitor, the see-through display procedure being triggered by a termination of the display of the animation image, the see-through blind-spot image being viewed from the position of the driver's point of view through a semi-transparent vehicle cabin image.

9. A blind-spot image display system for a vehicle, said blind-spot image display system comprising:
a camera configured to capture surroundings of a vehicle, the surroundings being a blind spot from a driver;
a monitor set at a location in a cabin of the vehicle; and
an image processing controller configured to generate a monitor image signal for the monitor by image processing based on a real camera image signal inputted from the camera, the image processing controller including:
a blind-spot image formation unit configured to perform point-of-view conversion on the real camera image signal inputted from the camera into a blind-spot image that is viewed from a position of the driver's point of view;
a vehicle cabin image formation unit configured to form a vehicle cabin image that is viewed from the position of the driver's point of view;
a see-through display image generation unit configured to render the vehicle cabin image to be superimposed on the blind-spot image into a semi-transparent vehicle cabin image; and
an animation display image generation unit configured to generate an animation display image in which the vehicle cabin image to be superimposed on the blind-spot image is shifted stepwise from a non-transparent image to a see-through image;
wherein the animation display image generation unit is configured to prepare a plurality of layers containing the vehicle cabin image and the blind-spot image, and to set, as a source image, a layer structure obtained by combining the layers stepwise, from the vehicle cabin image to the blind-spot image, and then upon starting an animation display, to generate a display image by image composition using varied transparencies for the respective layers, the display image being changed stepwise from a non-transparent vehicle cabin image at start to a blind-spot image seen through the vehicle cabin image.

* * * * *